(12) United States Patent
Lechtanski

(10) Patent No.: US 9,900,235 B2
(45) Date of Patent: Feb. 20, 2018

(54) PACKET DELAY VARIATION IN A PACKET SWITCHED NETWORK

(71) Applicant: Calnex Solutions Ltd., West Lothian (GB)

(72) Inventor: Michal Lechtanski, Edinburgh (GB)

(73) Assignee: Calnex Solutions Ltd., West Lothian (GB)

( * ) Notice: Subject to any disclaimer, the term of this patent is extended or adjusted under 35 U.S.C. 154(b) by 232 days.

(21) Appl. No.: 14/838,192

(22) Filed: Aug. 27, 2015

(65) Prior Publication Data
US 2016/0065442 A1 Mar. 3, 2016

(30) Foreign Application Priority Data
Aug. 29, 2014 (GB) .................................. 1415332.4

(51) Int. Cl.
*H04L 12/26* (2006.01)

(52) U.S. Cl.
CPC .......... *H04L 43/106* (2013.01); *H04L 43/087* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 8,094,686 B2 | 1/2012 | Bedrosian | |
| 2009/0259445 A1 | 10/2009 | Bedrosian | |
| 2010/0172255 A1* | 7/2010 | Cook | H04L 43/0847 370/252 |
| 2010/0220615 A1* | 9/2010 | Enstrom | H04L 29/06027 370/252 |
| 2011/0075577 A1* | 3/2011 | Chen | H04L 43/087 370/252 |
| 2013/0063441 A1* | 3/2013 | Choy | H04L 43/045 345/440.2 |
| 2013/0070777 A1* | 3/2013 | Hutchison | H04L 43/50 370/412 |
| 2013/0308471 A1* | 11/2013 | Krzanowski | H04L 43/0811 370/252 |
| 2014/0321285 A1* | 10/2014 | Chew | H04L 47/24 370/236 |

FOREIGN PATENT DOCUMENTS

EP 2158727 A2 3/2010

OTHER PUBLICATIONS

European Patent Office, Extended European Search Report for Application No. 15182684.9, dated Jan. 22, 2016, 9 pages, Germany.
Intellectual Property Office, Search Report for Application No. GB1415332.4, dated Feb. 6, 2015, 3 pages, United Kingdom.

* cited by examiner

*Primary Examiner* — Duc T Duong
(74) *Attorney, Agent, or Firm* — Alston & Bird LLP

(57) ABSTRACT

A packet switched network tester for testing a network using a packet delay variation test profile that has a plurality of different delays for applying to timestamps of packets received at the tester, the tester being configured to: detect a packet; determine whether a test profile delay when applied to the packet would result in a packet delayed to a time after any preceding packet; if not, repeat the steps of detecting and determining with subsequent packets; if yes, apply the delay to the timestamp of the packet and identify the next test profile delay; and repeat for the next test profile delay the steps of detecting and determining.

16 Claims, 18 Drawing Sheets

PACKET DELAY VARIATION IN A PACKET SWITCHED NETWORK

CROSS REFERENCE TO RELATED APPLICATIONS

This application claims priority to and the benefit of United Kingdom Patent Application Serial No. 1415332.4, filed Aug. 29, 2014, the contents of which as are hereby incorporated herein in their entirety by reference.

BACKGROUND

The present invention relates to packet switched network in-line tester and test method. In particular, the invention relates to a tester that is configured to generate packet delay variation by modifying a packet's timestamp according to a test scenario.

The performance of packet switched telecommunications networks has to be regularly tested. One way of doing this is to introduce known delay variations in a test scenario and monitor the network response. A standard approach to generating packet delay variation, also known as packet jitter, is based on modifying each packet's timestamp with a delay value according to a test profile. The test profile may be generated using a probability distribution, for example a Gaussian or uniform distribution. The test profile may be a function (e.g. step function, saw tooth) or may be otherwise defined by the user. Packets are stored in a buffer, alongside the modified timestamp, and sent out after the required delay time has lapsed.

In cases where the packet rate is relatively high, for example where the inter-packet gap ($\Delta t$) is smaller than the delay variation (ji, where i=0, 1, 2, ...) requested by the test profile, some packets are delayed long enough to affect subsequent packets. Those subsequent packets may then be delayed for longer than the delay time expected from the test profile. In these circumstances, the delayed packets are sent as soon as possible, but this can result in some packets being sent back to back. Case 1 below is an example where this problem is evident. This is illustrated in FIG. 1. Here, the inter-packet gap $\Delta t$ is 6 and the packet delays range from 0 to 7.

| | Case 1 $\Delta t = 6$ | | |
|---|---|---|---|
| Jitter profile: | | Timestamps: | |
| j0 | 5 | → t0' = t0 + j0 | t5' = t5 + j0 |
| j1 | 7 | → t1' = t1 + j1 | t6' = t6 + j1 |
| j2 | 1 | → t2' = t2 + j2 | t7' = t7 + j2 |
| j3 | 2 | → t3' = t3 + j3 | |
| j4 | 0 | → t4' = t4 + j4 | |

As can be seen from FIG. 1, for t1' and t6' some packets have a delay that affects following packets, and as a result packets are sent back-to-back. For example, for packet t2' (t7') the delay defined by the test profile should have been 1, but in practice because of t1', the delay for t2' is 2, which is longer than expected. For packet t4' the minimum latency is achieved and the packet is not affected by jitter values from previous packets.

Case 2 below is another example where this problem is evident. This is illustrated in FIG. 2. As before, the packet delays range from 0 to 7. However, the packet rate is higher and the inter-packet gap is lower than the example of FIG. 1. In particular, the inter-packet gap is 3.

| | Case 2 $\Delta t = 3$ | | | |
|---|---|---|---|---|
| Jitter profile: | | Timestamps: | | |
| j0 | 5 | t0' = t0 + j0 | t5' = t5 + j0 | t10' = t10 + j0 | t15' = t15 + j0 |
| j1 | 7 | t1' = t1 + j1 | t6' = t6 + j1 | t11' = t11 + j1 | |
| j2 | 1 | t2' = t2 + j2 | t7' = t7 + j2 | t12' = t12 + j2 | |
| j3 | 2 | t3' = t3 + j3 | t8' = t8 + j3 | t13' = t13 + j3 | |
| j4 | 0 | t4' = t4 + j4 | t9' = t9 + j4 | t14' = t14 + j4 | |

In this example, t1' is delayed by 7. This affects following packets, and so some packets are sent back-to-back. In particular, t1', t2', t3' and t4' are sent back to back. In this case, t4' does not achieve minimum latency. Instead, packet t4' is affected by jitter values from previous packets. As a result, all packets (t0'-t15') are delayed, the minimum latency value is increased and the maximum jitter value is reduced. Some parts of the jitter profile become constant latency.

As demonstrated above, the standard approaches to jitter test do not guarantee that all packets are delayed for the time defined in the test profile. Instead packets are often delayed for longer. In addition, in some cases, the total packet delay variation may be reduced. This limits the accuracy of the test.

BRIEF SUMMARY

According to the present invention there is provided a packet switched network in-line tester for testing a network using a packet delay variation test profile that has a plurality of different delays for applying to timestamps of packets received at the tester, the tester being configured to:

detect a packet;
  determine whether a test profile delay when applied to the packet would result in the packet being delayed to a time after any preceding packet;
  if not, repeat the steps of detecting and determining with subsequent packets;
  if yes, apply the delay to the timestamp of the packet and identify the next test profile delay; and
  repeat, until the test is completed, the steps of detecting a packet and determining whether the next test profile delay when applied to the packet would result in a packet delayed to a time after any preceding packet.

The invention provides a jitter test that involves determining whether it would be possible to delay an arriving packet accurately. If it is possible to do so, the delay is applied and then the test moves to the next delay in the test profile. This is achieved in practice by monitoring a period of time needed to send each packet, as well as the duration of the test profile delay and any delay applied to preceding packets. An advantage of doing this is that it allows relatively large jitter values to be applied in highly utilized (up to 100% bandwidth) networks.

The tester may be configured to leave a packet timestamp unmodified when it is determined that a test profile delay when applied to the packet would not result in the packet being delayed to a time after any preceding packet.

The tester may be configured to modify the packet timestamp when it is determined that a test profile delay when applied to the packet would not result in the packet being delayed to a time after any preceding packet.

The tester may have a jitter delay circuit for applying the test profile delays to a timestamp.

The tester may be configured to determine a period of time required to send each packet and use this to determine whether the next test profile delay when applied to the next packet would result in a packet that is delayed to a time after the previous packet. A packet send time controller may be provided for determining the time needed to send a received packet. The time needed to send a received packet may be determined using a packet length and a line rate.

The tester may be configured to use a previously applied delay and the period of time required to send a packet to determine whether the next test profile delay when applied to that packet would result in a packet delayed to a time after the previous packet.

The tester may include a counter for use in determining whether the next test profile delay when applied to the next packet would result in a packet that is delayed to a time after the previous packet.

The tester may be configured to store or record a previous delay for use in determining whether the next test profile delay when applied to the next packet would result in a packet that has a timestamp after the timestamp of the previous packet. A latch register may be latched to a previous delay.

Preferably, the packet switched network in-line tester is implemented in hardware, for example using field programmable gate arrays (FPGAs).

According to another aspect of the present invention there is provided a method of testing a packet switched network using a packet delay variation test profile that has a plurality of different delays for applying to timestamps of packets, the method involving:

detecting a packet;

determining whether a test profile delay when applied to the packet would result in a packet delayed to a time after any preceding packet;

if not, repeating the steps of detecting and determining with subsequent packets;

if yes, applying the delay to the timestamp of the packet and identify the next test profile delay; and repeating the steps of detecting a packet and determining whether the next test profile delay when applied to a packet would result in that packet being delayed to a time after any preceding packet.

The method may involve applying the test profile delays to a timestamp in the event that when applied to the next packet that packet has a timestamp after the timestamp of the previously delayed packet.

The method may involve determining a time required to send each packet and using this to determine whether the next test profile delay when applied to the next packet would result in a packet that is delayed to a time after the previous packet.

The method may involve using a counter for determining whether the next test profile delay when applied to the next packet would result in a packet that is delayed to a time after the previous packet.

The method may involve using a latch register for latching a previous delay for use in determining whether the next test profile delay when applied to the next packet would result in a packet that has a timestamp after the timestamp of the previously delayed packet.

The method may involve determining the time needed to send a received packet and using this to determine whether a next delayed packet would have a timestamp after the previously delayed packet.

Preferably, the packet switched network in-line test method is implemented using field programmable gate arrays (FPGAs).

BRIEF DESCRIPTION OF THE FIGURES

Various aspects of the invention will now be described by way of example only and with reference to the accompanying drawings, of which.

DETAILED DESCRIPTION OF VARIOUS EMBODIMENTS

The present invention relates to a dynamic jitter tester and test method for generating packet delay variation by modifying a packet's timestamp with a delay value according to a test profile.

Figure 1:
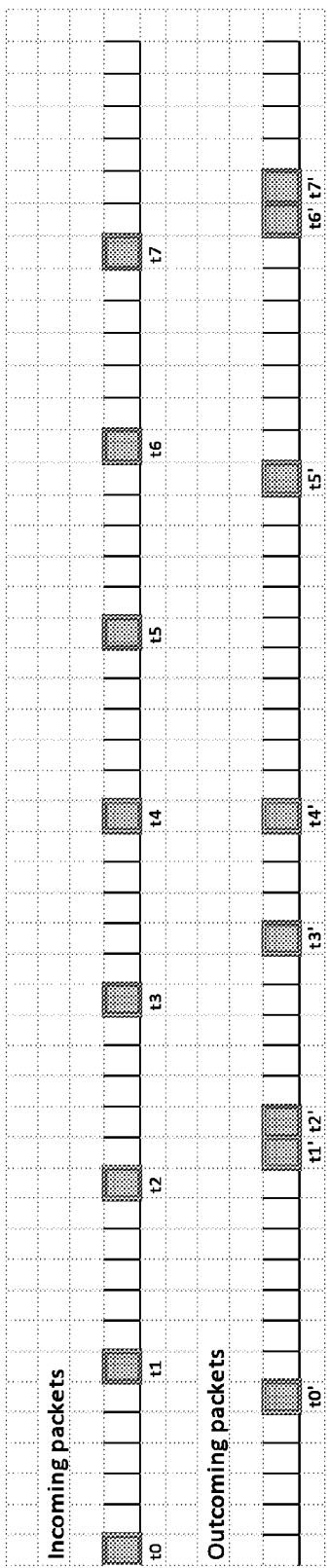
FIG. 1 is a schematic view of a stream of packets in a packet switched network, and the same stream with a jitter profile applied using a prior art method.
Figure 2:
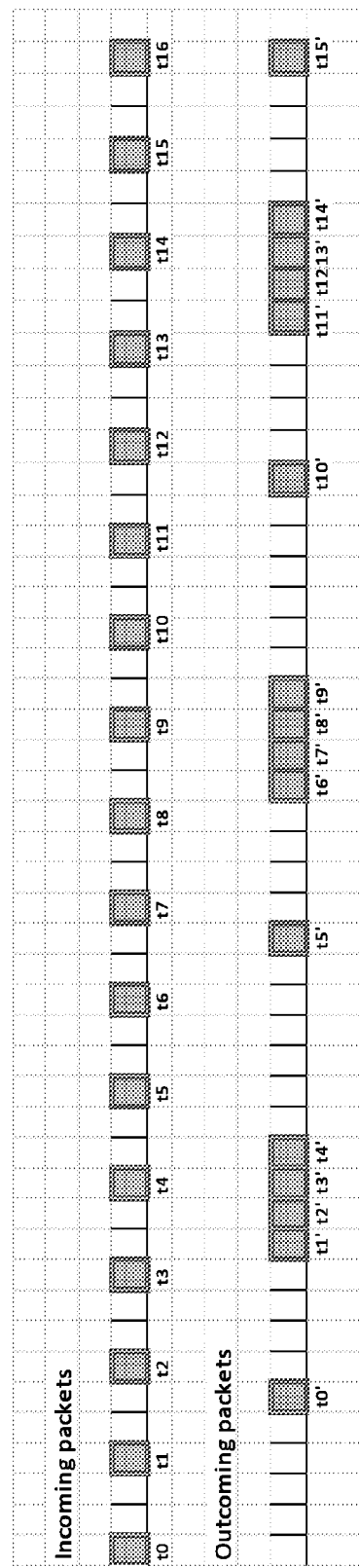
FIG. 2 is schematic view of another stream of packets, which has a smaller inter-packet gap than for the stream of FIG. 1, and the same stream with the same jitter profile as used for FIG. 1 applied using a prior art method.
Figure 3:
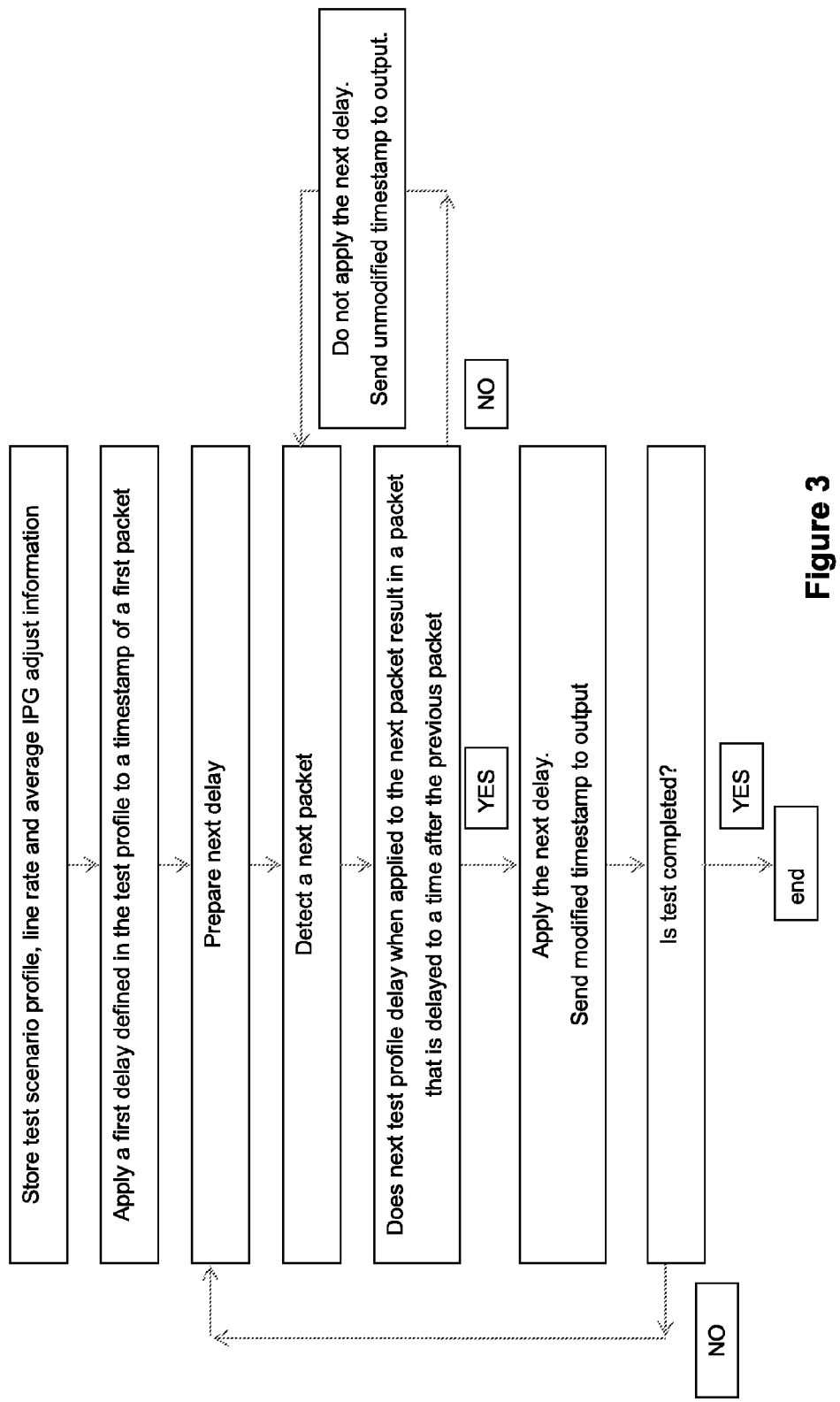
FIG. 3 is a flow diagram of a method for applying a jitter profile in accordance with the invention.

FIG. 3 shows steps of a first method for accurately implementing a jitter test. This involves applying a first delay defined in a test profile to a timestamp of a first packet; identifying a next delay defined in the test profile; and determining whether the next test profile delay when applied to the next packet would result in a packet that has a timestamp after the immediately preceding packet. If the answer to this is yes, then the next delay is applied. If the answer is no, then the delay in not applied and the packet timestamp is unmodified. This is continued until the next delay is applied. Then a subsequent delay in the test profile is identified and the process of determining whether the next delay can be applied is repeated until the test is completed.

In practice, packets are stored in a buffer (alongside the modified timestamp) and sent out after the required delay time has lapsed. A packet cannot be delayed accurately if its timestamp is smaller than the previous packet's timestamp. No packet reordering takes place, and when a packet's timestamp is smaller than the previous packet's timestamp that packet is stored in the buffer and sent out with minimum inter-packet gap as soon as the previous packet is sent out. The number of packets that can be sent with minimum inter-packet gap depends on bandwidth utilization. Higher bandwidth utilization results in a greater number of packets. Each time a packet arrives, the calculations are repeated.

Figure 4:
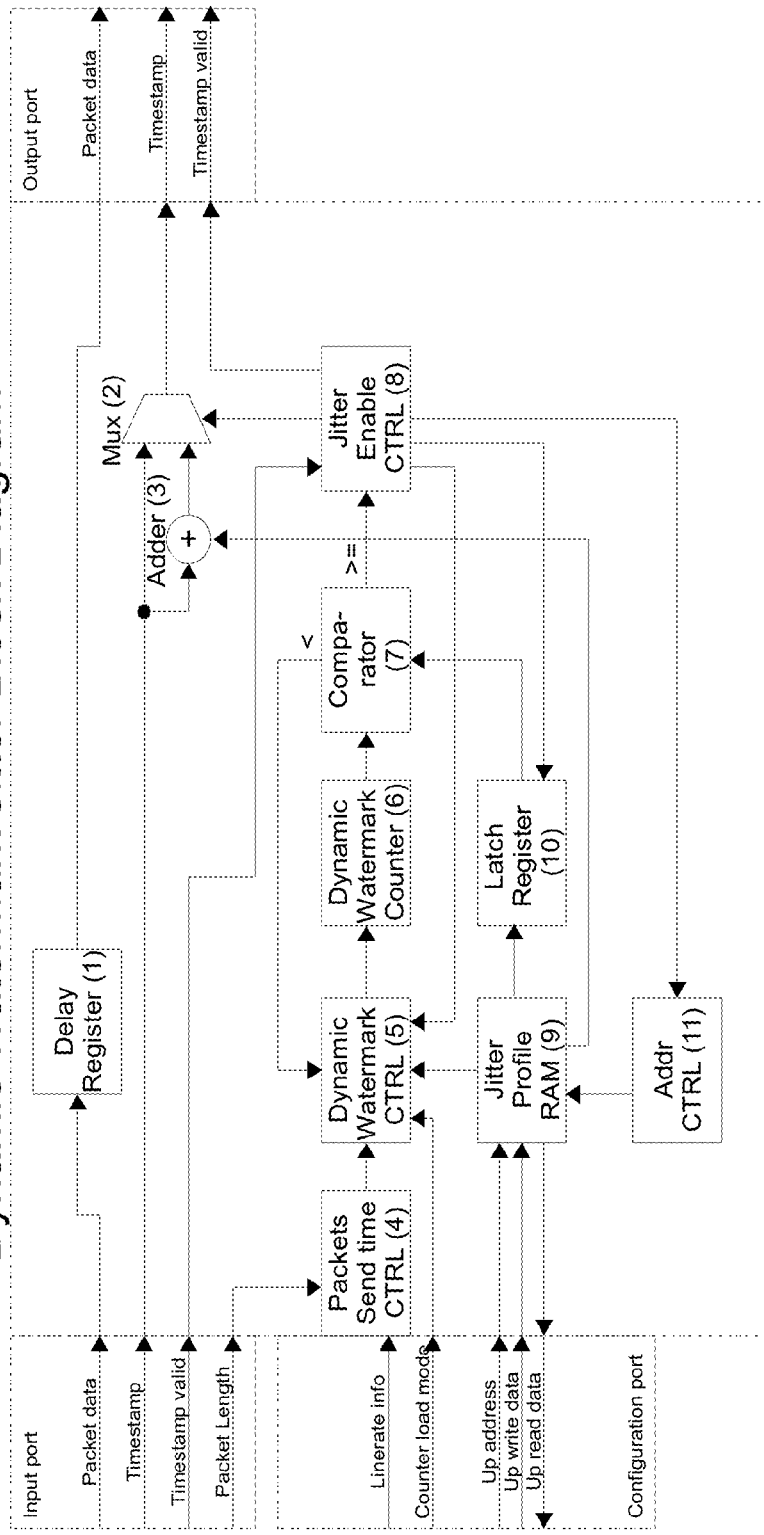
FIG. 4 is a block diagram of a jitter profile system in accordance with the invention.

FIG. 4 shows a dynamic jitter circuit for accurate control of delay variation in a packet switched network tester. This has an input port that receives packet data and its associated timestamp, as well as a timestamp valid signal and information on the packet length. The packet data is passed to a delay register 1 for delaying incoming packet data, so that it is aligned with a generated timestamp and timestamp valid signals at an output port. The timestamp is passed to a multiplexer 2, which is used to switch between a received timestamp position and a modified timestamp position. In the received timestamp position the timestamp is passed to the output unmodified. In the modified timestamp position, timestamp modification is implemented. This is done using an adder 3 that adds a modification to the original timestamp as and when the multiplexer 2 is switched to the modify timestamp position. Timestamp modifications are controlled by a jitter control part of the circuit.

The function of the jitter control part of the circuit is to apply delay variations to packet timestamps, but only if those delays can be accurately implemented. To achieve this, the impact of successive delays in the jitter test profile has to be assessed and delays only applied when the timestamp of the delayed packet is after the timestamp of a previously delayed packet. If this condition is not met, then packets arriving are passed to the output port without a modified delay. This continues until the condition is met, and the next delay in the jitter test profile can be applied.

The jitter control part of the circuit has a configuration port that provides line rate information, a counter load mode for initialising a counter and jitter test profiles. Connected to the configuration port is a packet send time control block 4, which calculates the amount of time required to send out an arriving packet, depending on its length (provided via the input port) and configured line rate. A minimum inter-packet gap of twelve bytes is assumed. Connected to the packet send time control block 4 is a dynamic watermark controller 5, which controls the behaviour of a dynamic counter 6. At an output of the dynamic counter 6 is a comparator 7. Feeding into the dynamic watermark controller 5 is the counter load mode, which defines an initial state for the dynamic counter 6, and an output of a jitter profile RAM 9. This is a random access memory for storing jitter test profile samples. These profiles are input to the RAM 9 via the configuration port. The jitter profile RAM 9 is also connected to a latch register 10, the adder 3 and an address controller 11. Under operating conditions, the latch register 10 contains the previous jitter profile sample. A jitter enable controller 8 controls the dynamic watermark controller 5, the latch register 10, the address controller 11 and the multiplexer 2. Input to the jitter enable controller 8 is an output from the comparator 7 and the original timestamp valid signal.

The dynamic watermark counter 6 is an incrementing counter. The comparator 7 compares the value of the dynamic counter 6 with the value of the latch register 10. The jitter enable controller 8 is configured to switch the multiplexer 2 to the modify timestamp position when the output of the comparator 7 indicates that the value of the dynamic counter 6 is greater than the value of the latch register 10. Additionally, the jitter enable controller 8 is operable to cause the current jitter profile sample to be latched in the latch register 10, increment the address of the jitter profile RAM 9 through the address controller 11, and clear/load of the dynamic counter 6 through the dynamic watermark controller 5. Once this is done, the jitter profile RAM 9 is set to the next jitter sample in the test profile, and the latch register is latched to the previous jitter sample. The jitter enable controller 8 also regenerates a timestamp valid signal, so that it is aligned with the actual timestamp. The address controller generates an address for the jitter profile RAM 9. The address is incremented, as requested by the jitter enable controller 8, and wrapped-around, once the maximum value has been reached or cleared, when the circuit has been disabled.

In use, prior to sending any traffic, the jitter circuit is configured through the configuration port. The jitter profile RAM 9 is loaded with test scenario profiles. Line rate information also has to be provided (for example 100 Mb, 1 Gb, 10 Gb). Once the configuration is done, the circuit is ready to process traffic. The default setting for the jitter enable controller 8 allows the first arriving packet's timestamp to be modified. When the packet arrives, a timestamp valid signal flags a new timestamp on the input port. The jitter enable controller 8 switches the multiplexer 2. This causes the current jitter sample in the jitter profile RAM 9 to be added by the adder 3 to the original timestamp resulting in a modified timestamp at the output port. At the same time, the jitter enable controller 8 latches the current jitter sample value in the latch register 10, and sends a signal to the address controller 11 to increment the address in the jitter profile RAM 9, so that next jitter sample is available in the RAM 9.

Once available, the next jitter sample is loaded to the dynamic watermark counter 6 through the dynamic watermark controller 5. Alternatively, depending on the counter load mode configuration signal, the dynamic watermark counter 6 is cleared. Additionally, the dynamic watermark controller 5 receives data from the packets send time controller 4 about the time required to send out the current packet and waits for that period of time. Once the time has lapsed, the dynamic watermark controller 5 starts incrementing the dynamic watermark counter until it reaches the value of the latch register 10. If another packet arrives while the counter is still running, the jitter enable controller 8 will not allow the timestamp to be modified. The original timestamp will be sent to the output port alongside the packet data and this packet will be output unmodified. Each time a packet arrives, the packets send time controller 4 calculates the time needed to send out that arriving packet, and then passes that information to the dynamic watermark controller 5. Incrementing of the dynamic watermark counter 6 is paused for that period of time after which the dynamic watermark controller 5 resumes incrementing the dynamic watermark counter 6. These steps are repeated for each arriving packet until the dynamic watermark counter 6 reaches the value of the latch register 10.

Since the latch register has the delay for the previous modified packet and the packet send time accounts for the time for sending the current packet, then once the dynamic watermark counter 6 matches the latch register any packet arriving after that and modified with the current jitter sample has to have a timestamp after the previously modified packet. Hence, the next packet can be accurately and reliably modified with the current jitter sample. When the dynamic watermark counter 6 matches the latch register, this is detected by the comparator 7, which causes the jitter enable controller 8 to switch the multiplexer 2 to allow the next arriving packet's timestamp to be modified. The process is repeated until the test is complete or the circuitry is disabled.

Figure 5:
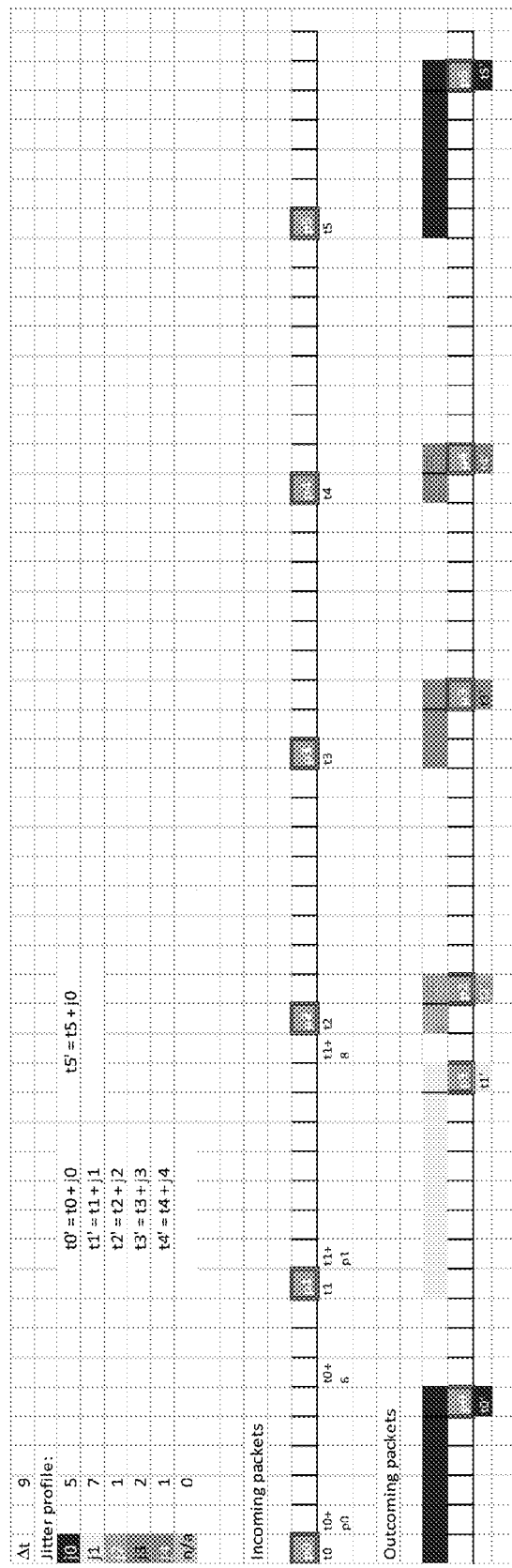
FIGS. 5 to 8 show schematic views of various streams of packets in a packet switched network with and without a jitter profile applied using the system of FIG. 4.

FIG. 5 shows a first example of how the above described methodology can be applied. This is for case 3a, which has the following jitter profile:

| Δt 9 | | | |
|---|---|---|---|
| Jitter profile: | | | |
| j0 | 5 | t0' = t0 + j0 | t5' = t5 + j0 |
| j1 | 7 | t1' = t1 + j1 | |
| j2 | 1 | t2' = t2 + j2 | |
| j3 | 2 | t3' = t3 + j3 | |
| j4 | 1 | t4' = t4 + j4 | |
| n/a | 0 | | |

In this case, $t_{0-}$: prior to time $t_0$ the component is configured with jitter profile RAM 9, line rate and counter load mode. For this example, the counter load mode is set in such way that the dynamic watermark counter 6 is cleared.

$t_0$: a packet p0 arrives and its timestamp is modified with the first (j0) jitter profile sample. In addition, the packets send time controller 4 uses the packet length and the line rate to determine how long it takes for the packet to be sent.

$t_{0+}$: the jitter sample j0 is latched, the address of the jitter profile RAM 9 is incremented to the next jitter sample, the dynamic watermark counter 6 is cleared and the dynamic watermark controller 5 waits for the amount of time for the packet to be sent, as received from the packets send time controller 4.

$t_{0+p0}$: the dynamic watermark counter 6 starts incrementing from zero.

$t_{0+6}$: after five additional time units, the dynamic watermark counter 6 reaches the value of the latch register 10; the multiplexer 2 is switched and the next arriving packet's timestamp will be modified.

$t_1$: the next packet p1 arrives and its timestamp is modified with the second (j1) jitter profile sample, and the packets send time controller 4 uses the packet length and the line rate to determine how long it takes for the packet to be sent.

$t_{1+}$: jitter sample (j1) is latched, the jitter profile RAM's address is incremented, the dynamic watermark counter 6 is cleared and the dynamic watermark controller 5 waits for the amount of time for the packet to be sent, as received from the packets send time controller 4.

$t_{1+p1}$: the dynamic watermark counter 6 starts incrementing from zero.

$t_{1+8}$: after seven additional time units, the dynamic watermark counter 6 reaches the value of the latch register 11; the multiplexer 2 is switched and the next arriving packet's timestamp will be modified.

$t_2$: the next packet p2 arrives and its timestamp is modified with the third (j2) jitter profile sample.

Figure 6:
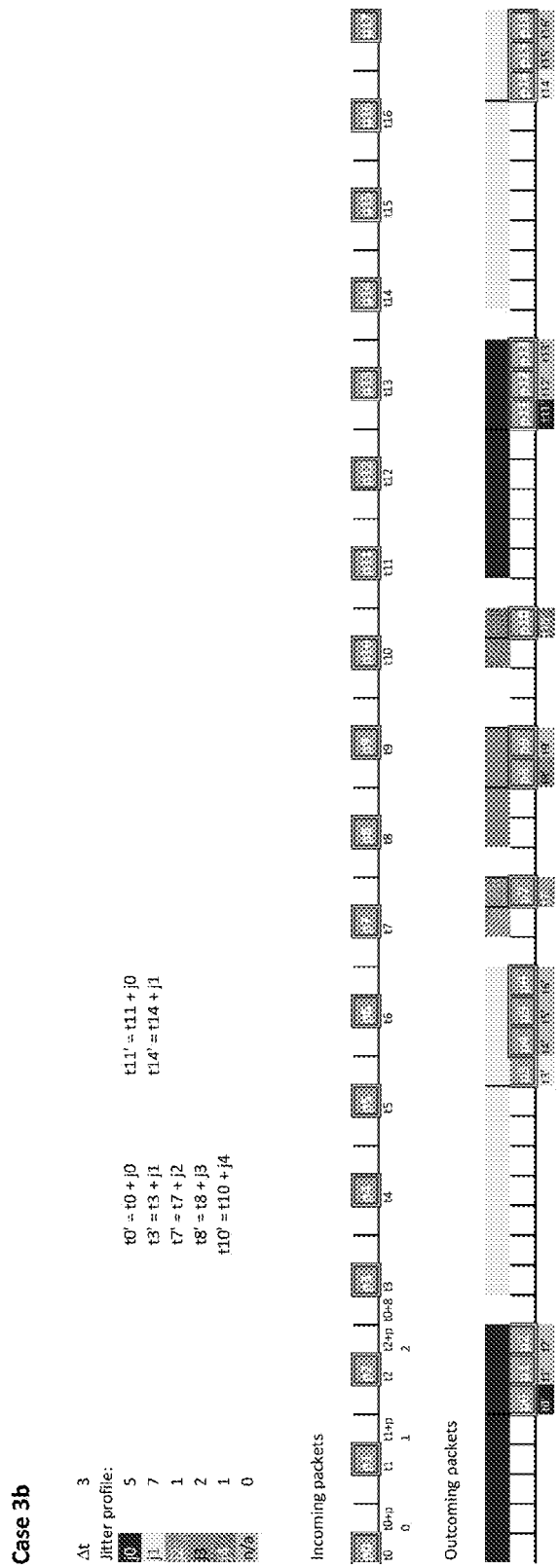

FIG. 6 shows another example of how the above described methodology can be applied. This is for case 3b, which has the following jitter profile:

| Δt 3 | | | |
|---|---|---|---|
| Jitter profile: | | | |
| j0 | 5 | t0' = t0 + j0 | t11' = t11 + j0 |
| j1 | 7 | t3' = t3 + j1 | t14' = t14 + j1 |
| j2 | 1 | t7' = t7 + j2 | |
| j3 | 2 | t8' = t8 + j3 | |

| Δt 3 | | |
|---|---|---|
| Jitter profile: | | |
| j4 | 1 | t10' = t10 + j4 |
| n/a | 0 | |

In this case, $t_{0-}$: prior to time t0 the circuit is configured with: the jitter profile, the line rate and the counter load mode. For this example, the counter load mode is set in such way, that the dynamic watermark counter 6 is cleared.

$t_0$: a packet p0 arrives and its timestamp is modified with the first (j0) jitter profile sample. The modified timestamp is sent to the output port. In addition, the packets send time controller 4 uses the packet length and the line rate to determine how long it takes for the packet to be sent.

$t_{0+}$: the jitter sample j0 is latched, the jitter profile RAM's address is incremented, the dynamic watermark counter 6 is cleared and the dynamic watermark controller 5 waits for the amount of time for the packet to be sent, as received from the packets send time controller 4.

$t_{0+p0}$: the dynamic watermark counter 6 starts incrementing from zero.

$t_1$: another packet p1 arrives while the counter 6 is still running; the original timestamp is sent to the output port alongside packet data and the packets send time controller 4 uses the packet length and the line rate to determine how long it takes for the packet to be sent. Incrementing of the dynamic watermark counter 6 is paused.

$t_{1+p1}$: the dynamic watermark counter 6 resumes incrementing.

$t_2$: another packet p2 arrives while the counter 6 is still running; the original timestamp is sent to the output port alongside packet data and the packets send time controller 4 uses the packet length and the line rate to determine how long it takes for the packet to be sent. Incrementing of the dynamic watermark counter 6 is paused for the amount of time for the packet to be sent.

$t_{2+p2}$: the dynamic watermark counter 6 resumes incrementing.

$t_{0+8}$: the dynamic watermark counter 6 reaches the value of the latch register 10; the multiplexer 2 is switched and next arriving packet's timestamp will be modified.

$t_3$: next packet p3 arrives and its timestamp is modified with the second (j1) jitter profile sample. The packets send time controller 4 uses the packet length and the line rate to determine how long it takes for the packet to be sent.

$t_{3+}$: the current jitter sample j1 is latched, the jitter profile RAM's address is incremented to the next jitter profile j2, the dynamic watermark counter 6 is cleared, the dynamic watermark controller 5 waits for the amount of time for the packet to be sent, as received from the packets send time controller 4 and the process repeats.

Figure 7:
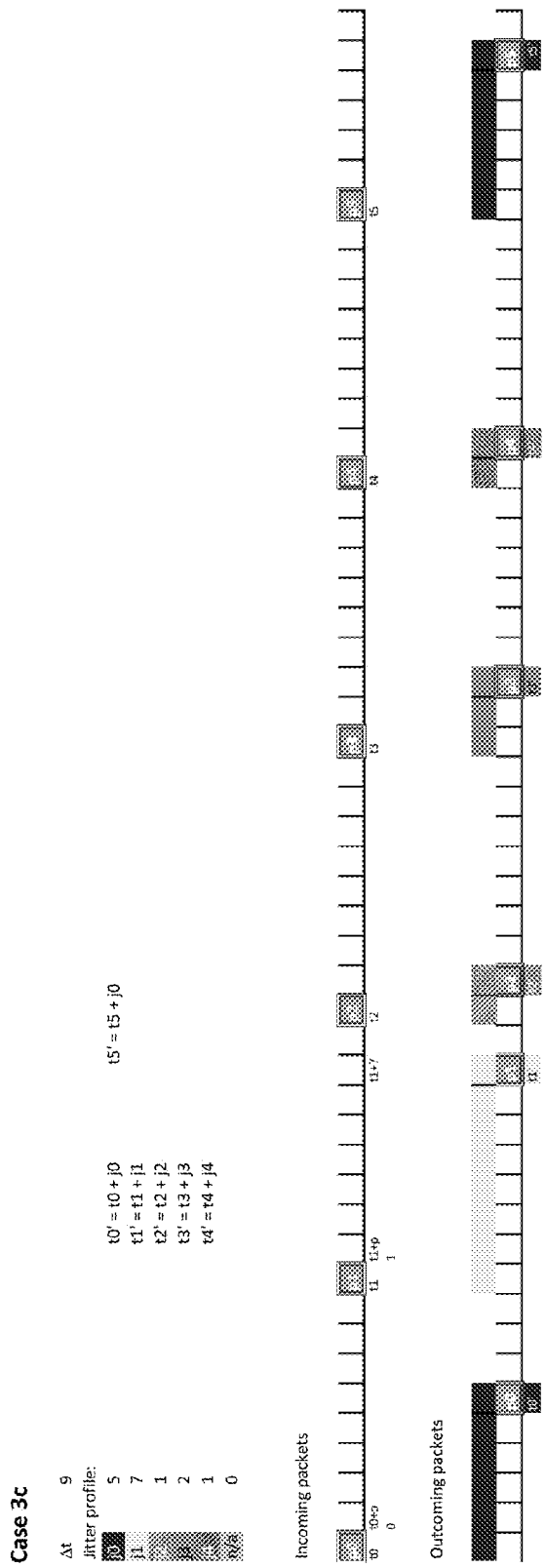

FIG. 7 shows another example of how the above described methodology can be applied. This is for case 3c, which has the following jitter profile:

| Δt 9 | | | |
|---|---|---|---|
| Jitter profile: | | | |
| j0 | 5 | t0' = t0 + j0 | t5' = t5 + j0 |
| j1 | 7 | t1' = t1 + j1 | |
| j2 | 1 | t2' = t2 + j2 | |
| j3 | 2 | t3' = t3 + j3 | |
| j4 | 1 | t4' = t4 + j4 | |
| n/a | 0 | | |

In this case, $t_{0-}$: prior to time t0 the circuit is configured with the jitter profile, line rate and the counter load mode. For this example, the counter load mode is set in such way that the dynamic watermark counter 6 is loaded with next jitter sample.

$t_0$: the packet arrives and its timestamp is modified with the first (j0) jitter profile sample. The packets send time controller 4 uses the packet length and the line rate to determine how long it takes for the packet to be sent.

$t_{0+}$: the jitter sample (j0) is latched, the jitter profile RAM's address is incremented. Once available, the next jitter sample (j1) is loaded to the dynamic watermark counter 6 and dynamic watermark controller 5 waits for the amount of time for the packet to be sent, as received from the packets send time controller 4.

$t_{0+p0}$: in this case, since the new jitter sample (j1) is greater than the previous one (j0), the dynamic watermark counter 6 is immediately greater than the value of the latch register 10, and so the multiplexer 2 is switched and the next arriving packet's timestamp will be modified.

$t_1$: next packet arrives and its timestamp is modified with the second (j1) jitter profile sample. The packets send time controller 4 uses the packet length and the line rate to determine how long it takes for the packet to be sent.

$t_{1+}$: jitter sample (j1) is latched, the jitter profile RAM's address is incremented, Once available, the next jitter sample (j2) is loaded to the dynamic watermark counter 6 and the dynamic watermark controller 5 waits for the amount of time for the packet to be sent, as received from the packets send time controller 4.

$t_{1+p1}$: The dynamic watermark counter 6 starts incrementing from the value of j2.

$t_{1+7}$: After six additional time units, the dynamic watermark counter 6 reaches the value of the latch register 10; the multiplexer 2 is switched and the next arriving packet's timestamp will be modified.

$t_2$: the next packet arrives and its timestamp is modified with the third (j2) jitter profile sample. The packets send time controller 4 uses the packet length and the line rate to determine how long it takes for the packet to be sent.

$t_{2+}$: the process is repeated until the circuit is disabled or the test is completed.

Figure 8:
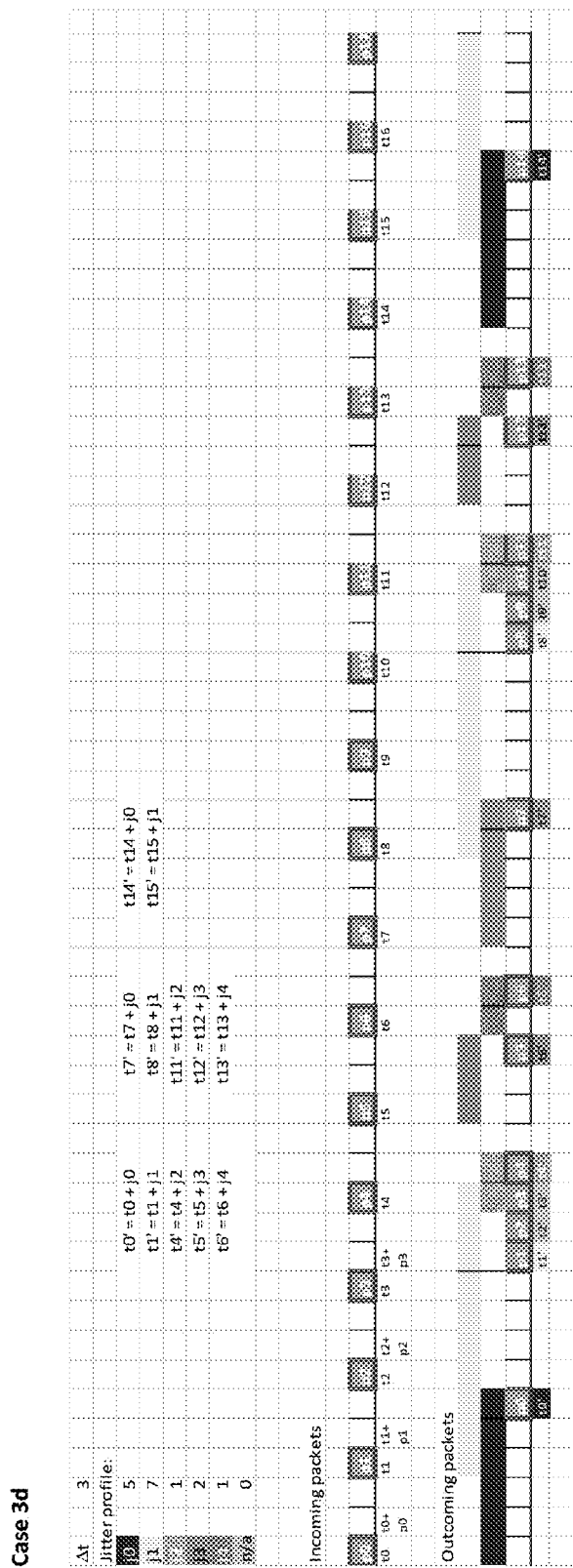

FIG. 8 shows another example of how the above described methodology can be applied. This is for case 3d, which has the following jitter profile:

| Δt 3 | | | | |
|---|---|---|---|---|
| Jitter profile: | | | | |
| j0 | 5 | t0' = t0 + j0 | t7' = t7 + j0 | t14' = t14 + j0 |
| j1 | 7 | t1' = t1 + j1 | t8' = t8 + j1 | t15' = t15 + j1 |

-continued

| Δt 3 | | | |
|---|---|---|---|
| Jitter profile: | | | |
| j2 | 1 | t4' = t4 + j2 | t11' = t11 + j2 |
| j3 | 2 | t5' = t5 + j3 | t12' = t12 + j3 |
| j4 | 1 | t6' = t6 + j4 | t13' = t13 + j4 |
| n/a | 0 | | |

In this case, $t_{0-}$: prior to time to the circuit is configured with: the jitter profile, line rate and counter load mode. For this example, the counter load mode is set in such way, that the dynamic watermark counter 6 is loaded with the next jitter sample.

$t_0$: a packet arrives and its timestamp is modified with the first (j0) jitter profile sample. The packets send time controller 4 uses the packet length and the line rate to determine how long it takes for the packet to be sent.

$t_{0+}$: the jitter sample (j0) is latched, the address of the jitter profile RAM is incremented. Once available, the next jitter sample (j1) is loaded to the dynamic watermark counter 6 and the dynamic watermark controller 5 waits for the amount of time received from packets send time controller 4.

$t_{0+p0}$: since the new jitter sample (j1) is greater than the previous one (j0), the dynamic watermark counter 6 is immediately greater than the value of the latch register 10; the multiplexer 2 is switched and next arriving packet's timestamp will be modified.

$t_1$: the next packet arrives and its timestamp is modified with the second (j1) jitter profile sample. The packets send time controller 4 uses the packet length and the line rate to determine how long it takes for the packet to be sent.

$t_{1+}$: the jitter sample (j1) is latched, the jitter profile RAM's address is incremented. Once available, the next jitter sample (j2) is loaded to the dynamic watermark counter 6 and the dynamic watermark controller 5 waits for the amount of time received from the packets send time controller 4.

$t_{1+p1}$: the dynamic watermark counter 6 starts incrementing from the value of j2.

$t_2$: a packet arrives while the counter is still running. The original timestamp is sent to the output port alongside packet data and the packets send time controller 4 uses the packet length and the line rate to determine how long it takes for the packet to be sent. Incrementing of the dynamic watermark counter 6 is paused for the amount of time for the packet to be sent, as received from the packets send time controller 4.

$t_{2+p2}$: the dynamic watermark counter 6 resumes incrementing.

$t_3$: another packet arrives while the counter is still running; the original timestamp is sent to the output port alongside packet data and the packets send time controller 4 uses the packet length and the line rate to determine how long it takes for the packet to be sent. Incrementing of the dynamic watermark counter 6 is paused for the amount of time for the packet to be sent, as received from the packets send time controller 4.

$t_{3+p3}$: the dynamic watermark counter 6 resumes incrementing.

$t_{4-}$: prior to time t4, the dynamic watermark counter 6 reaches the value of the latch register 10; the multiplexer 2 is switched and the next arriving packet's timestamp will be modified.

$t_4$: the next packet arrives and its timestamp is modified with the third (j2) jitter profile sample. The packets send time controller 4 uses the packet length and the line rate to determine how long it takes for the packet to be sent.

Figure 9:
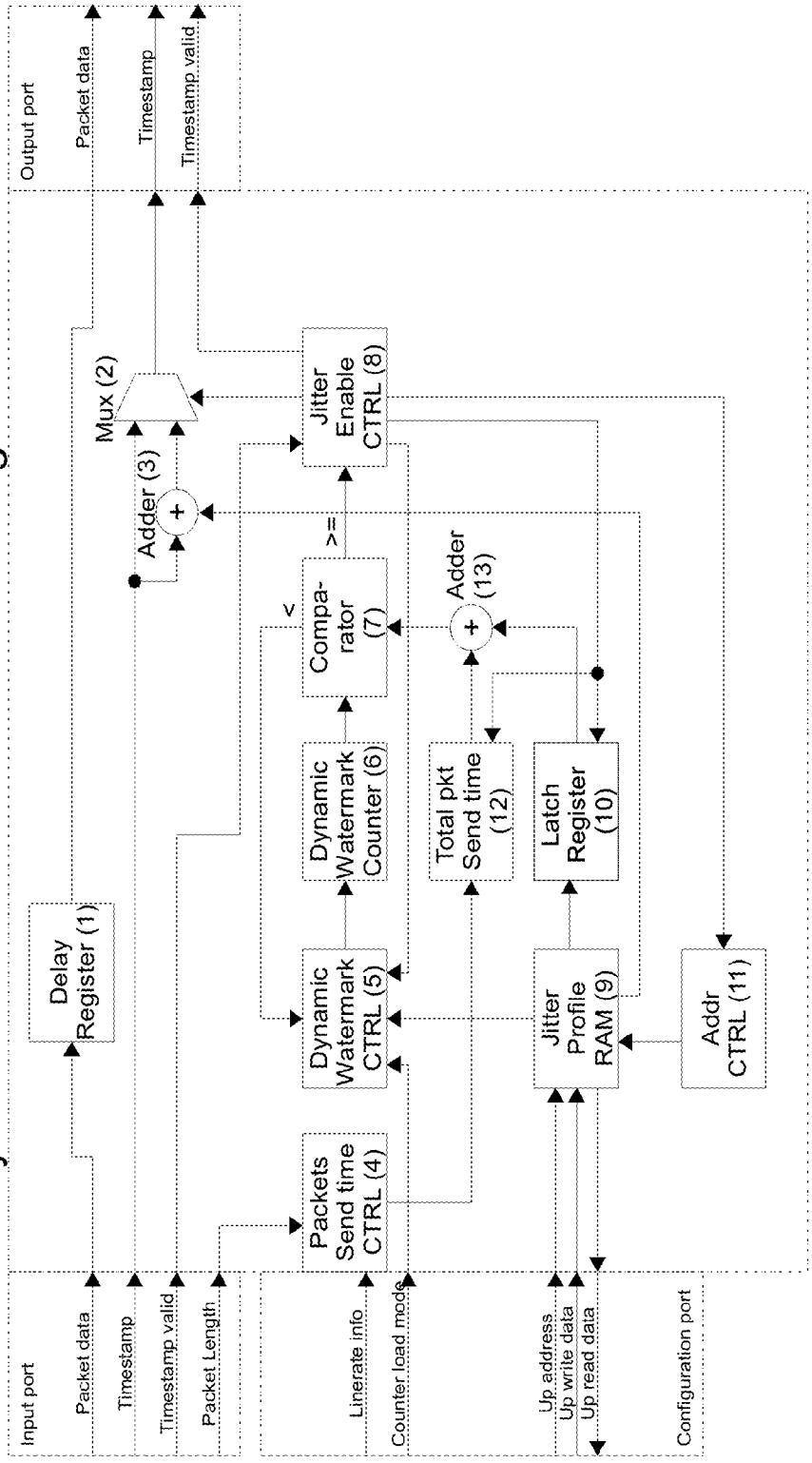
FIG. 9 is a block diagram of another jitter profile system in accordance with the invention.

FIG. 9 shows another circuit for implementing an accurate jitter test. The main differences between the circuit of FIG. 9 and the circuit of FIG. 4 are that the dynamic watermark controller 5 does not pause incrementing of the dynamic watermark counter 6 when a packet arrives. Instead, the packets send time controller 4 sends data to a total packet send time block 12, which accumulates the value. The accumulated value represents total time required to send out back-to-back (with minimum inter-packet gap) all packets, which arrived while the dynamic watermark counter 6 is being incremented. The accumulated time is added with the jitter sample latched in the latch register 10 and then compared on the comparator 7. In other words, the dynamic watermark counter 6 is not paused for the time required to send out an arriving packet, when the packet arrives. Instead, accumulated time is included at the comparator's 7 input. However, functionally, both implementations are the same.

The jitter control part of the circuit of FIG. 9 is very similar to that of FIG. 4, but it additionally has a total packet send time block 12 for receiving time data from the packets send time controller 4 and accumulating it and a second adder 13 for adding the latch register 10 and the total packet send time accumulated value and applying it to an input of the comparator 7. Under operating conditions, the latch register 10 contains the previous jitter profile sample. Outputs from the latch register 10 and the total packet send time 12 are fed to the second adder 13, which adder 13 is connected to the comparator 7. As before, the jitter enable controller 8 controls the dynamic watermark controller 5, the latch register 10, the address controller 11 and the multiplexer 2. Input to the jitter enable controller 8 is an output from the comparator 7 and the original timestamp valid signal.

The comparator 7 compares the value of the dynamic counter 6 with the value of the latch register 10 summed with the total packet send time 12. The jitter enable controller 8 is configured to switch the multiplexer 2 when the output of the comparator 7 indicates that the value of the dynamic counter 6 is greater than the summed value from the adder 13. As before, the jitter enable controller 8 is responsible for storing the current jitter profile sample in the latch register 10, incrementing the address of the jitter profile RAM 9 through the address controller 11, and clearing/loading of the dynamic counter 6 through the dynamic watermark controller 5. The jitter enable controller 8 also regenerates a timestamp valid signal, so that it is aligned with the actual timestamp.

Prior to sending any traffic, the component is configured through the configuration port. The jitter profile RAM 9 block is loaded with the test scenario profile and line rate information needs to be provided (for example 100 Mb, 1 Gb, 10 Gb). Once the configuration is done, the component is ready to process traffic. The default setting for the jitter enable controller 8 allows the next arriving packet's timestamp to be modified. When the packet arrives, the timestamp valid signal flags new timestamp on the input port. The jitter enable controller 8 switches the multiplexer 2, so that the sum of the current jitter value in the jitter profile RAM and the original timestamp is sent as a modified timestamp to the output port. At the same time, the jitter enable controller 8 latches the current jitter value in the latch register 10, and sends a signal to the address controller 11 to increment the jitter profile RAM's 9 address, so that next jitter sample is available. Once available, the next jitter sample is loaded to the dynamic watermark counter 6 through the dynamic watermark controller 5. Alternatively, depending on the counter load mode configuration signal, the dynamic watermark counter 6 is cleared. In addition, the total packet send time block 12 is cleared.

Next, the dynamic watermark controller 5 starts incrementing the dynamic watermark counter 6. Additionally, the total packet send time block 12 receives data from the packets send time controller 4 about the time required to send out the current packet and accumulates the value. The dynamic watermark counter 6 is incremented, until it reaches the value of the latch register 10 plus the total time in the total packet send time block 12, i.e. the output of the adder 13. If another packet arrives while the counter is still running, the jitter enable controller 8 will not allow timestamp to be modified. The original timestamp will be sent to the output port alongside packet data. Additionally, the total packet send time block 12 will receive and accumulate new data from the packets send time controller 4. The dynamic watermark controller 5 keeps incrementing the dynamic watermark counter 6. This is repeated for each arriving packet until the dynamic watermark counter 6 reaches the value of the output of the adder 13. The jitter enable controller 8 switches the multiplexer 2 and allows the timestamp of the next arriving packet to be modified.

Figure 10:
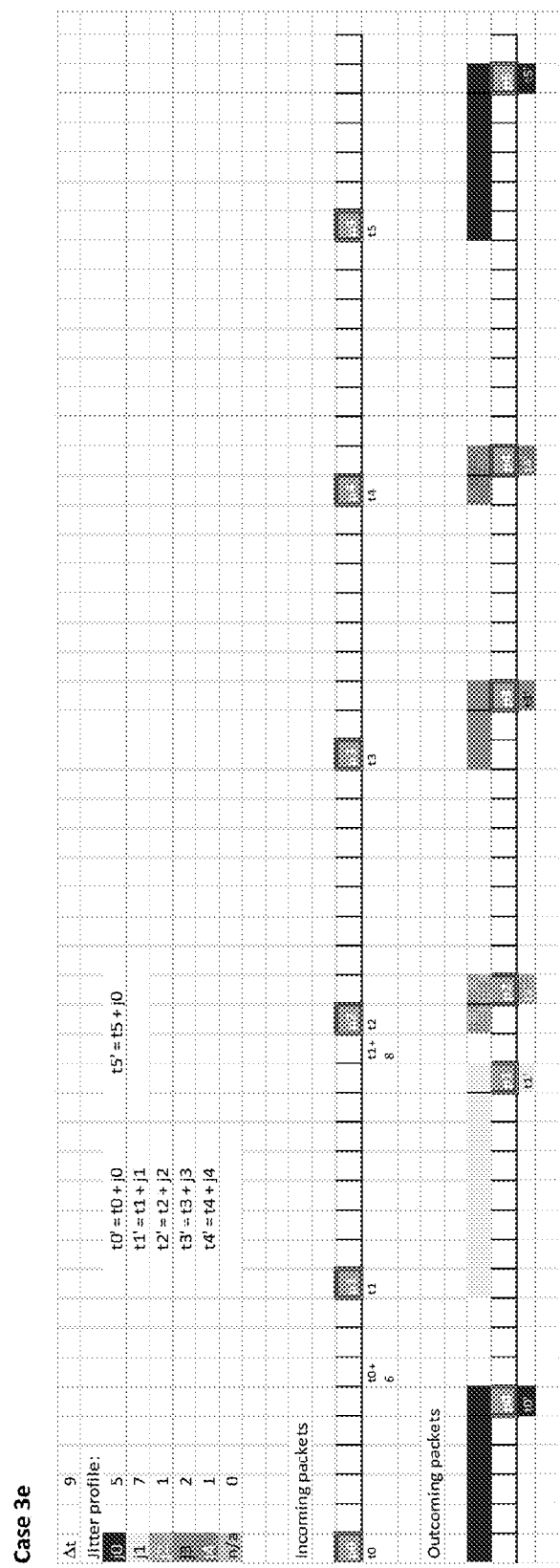
FIGS. 10 to 14 show schematic views of various streams of packets in a packet switched network with and without a jitter profile applied using the system of FIG. 9.

FIG. 10 shows an example of how the above descried methodology can be applied. This is for case 3e, which has the following jitter profile:

| Δt 9 | | | |
|---|---|---|---|
| Jitter profile: | | | |
| j0 | 5 | t0' = t0 + j0 | t5' = t5 + j0 |
| j1 | 7 | t1' = t1 + j1 | |
| j2 | 1 | t2' = t2 + j2 | |
| j3 | 2 | t3' = t3 + j3 | |
| j4 | 1 | t4' = t4 + j4 | |
| n/a | 0 | | |

$t_{0-}$: prior to time to the circuit is configured with: jitter profile RAM, line rate and counter load mode. For this example, the counter load mode is set in such way that the dynamic watermark counter 6 is cleared.

$t_0$: the packet arrives and its timestamp is modified with the first (j0) jitter profile sample. The packets send time controller 4 uses the packet length and the line rate to determine how long it takes for the packet to be sent.

$t_{0+}$: the jitter sample j0 is latched, the jitter profile RAM's address is incremented, and the dynamic watermark counter 6 is cleared. Then the dynamic watermark counter 6 starts incrementing from zero, the total packet send time is cleared and then loaded with data from the packets send time controller 4.

$t_{0+6}$: when the dynamic watermark counter 6 reaches the value of the latch register 10 added with the total packet send time 12, in this case after 6 time units; the jitter enable controller 8 causes the multiplexer 2 to be switched and the next arriving packet's timestamp will be modified.

$t_1$: the next packet arrives and its timestamp is modified with the second (j1) jitter profile sample. The packets send time controller 4 uses the packet length and the line rate to determine how long it takes for the packet to be sent.

$t_{1+}$: the jitter sample j1 is latched, the jitter profile RAM's address is incremented, and the dynamic watermark counter 6 is cleared. Then the dynamic watermark counter 6 starts incrementing from zero, the total packet send time block 12 is cleared and loaded with data from the packets send time controller 4.

$t_{1+8}$: when the dynamic watermark counter 6 reaches the value of latch register added with the total packet send time, in this case after 8 time units, the multiplexer 2 is switched and the next arriving packet's timestamp will be modified.

$t_2$: the next packet arrives and its timestamp is modified with the third (j2) jitter profile sample. The packets send time controller 4 uses the packet length and the line rate to determine how long it takes for the packet to be sent.

Figure 11:
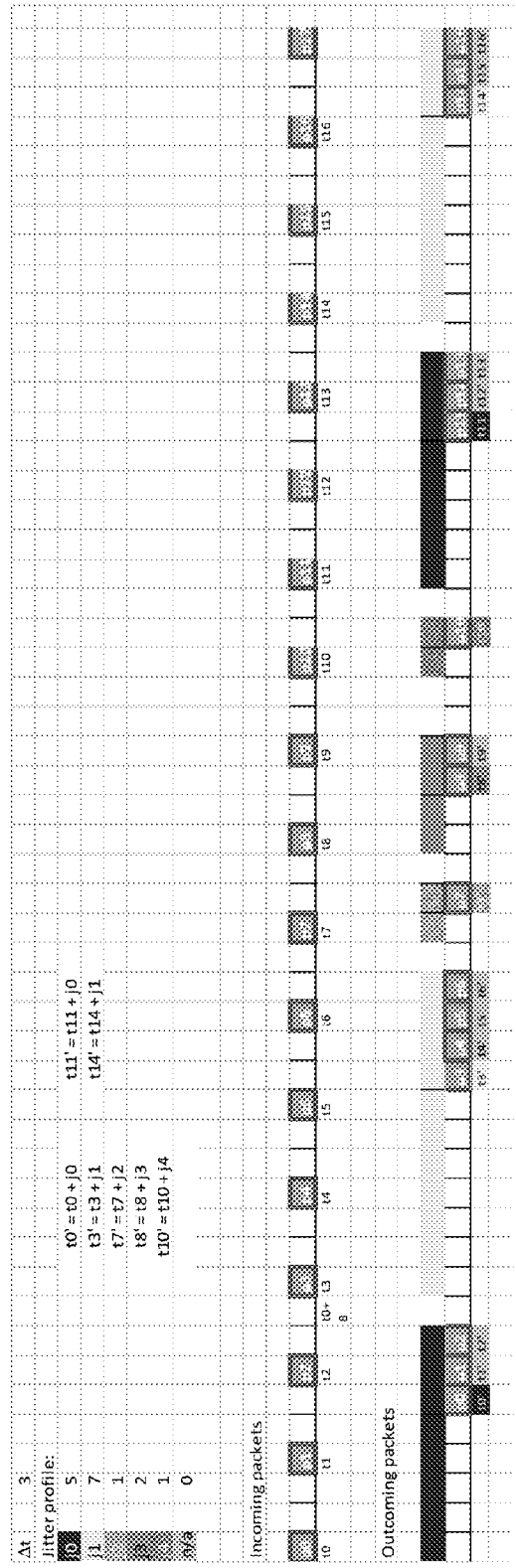

FIG. 11 shows another example of how the above described methodology can be applied. This is for case 3f, which has the following jitter profile:

| Δt 3 | | | |
|---|---|---|---|
| Jitter profile: | | | |
| j0 | 5 | t0' = t0 + j0 | t11' = t11 + j0 |
| j1 | 7 | t3' = t3 + j1 | t14' = t14 + j0 |
| j2 | 1 | t7' = t7 + j2 | |
| j3 | 2 | t8' = t8 + j3 | |
| j4 | 1 | t10' = t10 + j4 | |
| n/a | 0 | | |

$t_{0-}$: prior to time to the component is configured with the jitter profile, the line rate and the counter load mode. For this example, the counter load mode is set in such way that the dynamic watermark counter 6 is cleared.

$t_0$: when a packet arrives its timestamp is modified with the first (j0) jitter profile sample. The packets send time controller 4 uses the packet length and the line rate to determine how long it takes for the packet to be sent.

$t_{0+}$: jitter sample j0 is latched, the total packet send time block 12 is cleared, the jitter profile RAM's address is incremented, and the dynamic watermark counter 6 is cleared. The dynamic watermark counter 6 then starts incrementing from zero, and the total packet send time block 12 is loaded with data from the packets send time controller 4.

$t_1$: a packet arrives while the counter is still running, and the original timestamp is sent to the output port alongside the packet data. The packets send time controller 4 uses the packet length and the line rate to determine how long it takes for the packet to be sent. The total packet send time block 12 receives and accumulates the new packet send time data from the packets send time controller 4. The dynamic watermark counter 6 keeps incrementing.

$t_2$: another packet arrives while the counter is still running and the original timestamp is sent to the output port alongside the packet data. Again, the total packet send time block 12 receives and accumulates new data for the newly arrived packet from the packets send time controller 4. The dynamic watermark counter 6 keeps incrementing.

$t_{0+8}$: when the dynamic watermark counter 6 reaches the value of the latch register 10 added with the total packet send time 12, in this case after 8 time units; the multiplexer 2 is switched and the next arriving packet's timestamp will be modified.

$t_3$: the next packet arrives and its timestamp is modified with the second (j1) jitter profile sample.

Figure 12:
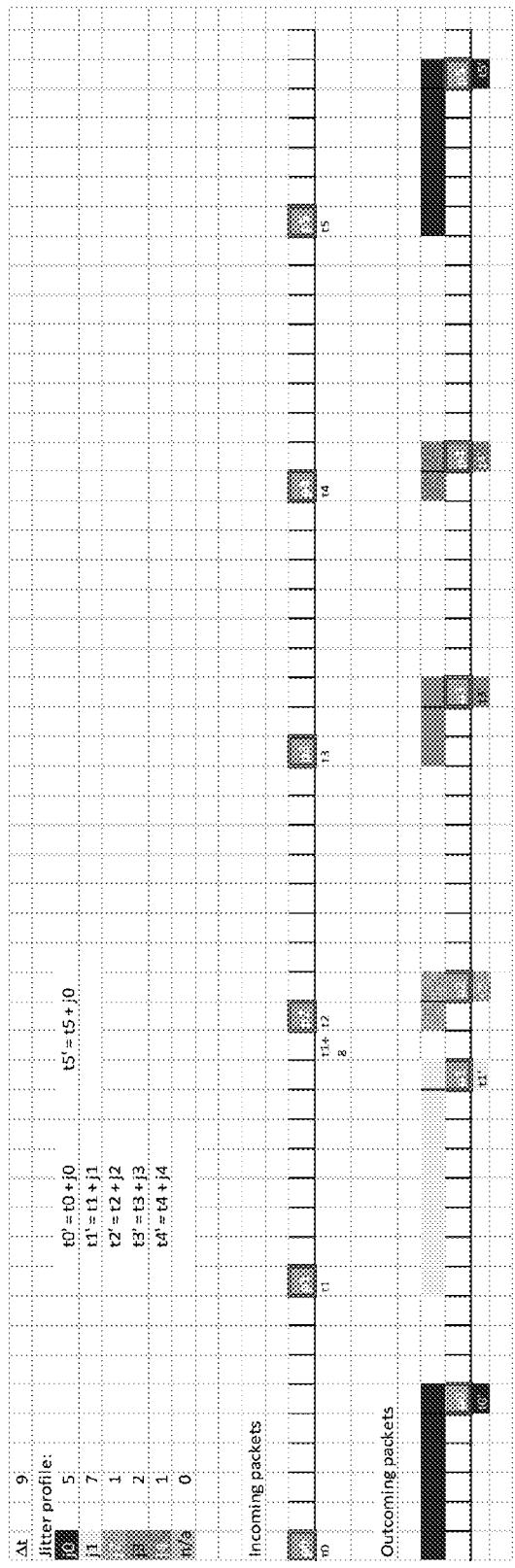

FIG. 12 shows another example of how the above described methodology can be applied. This is for case 3g, which has the following jitter profile:

| Δt 9 | | | |
|---|---|---|---|
| Jitter profile: | | | |
| j0 | 5 | t0' = t0 + j0 | t5' = t5 + j0 |
| j1 | 7 | t1' = t1 + j1 | |
| j2 | 1 | t2' = t2 + j2 | |
| j3 | 2 | t3' = t3 + j3 | |
| j4 | 1 | t4' = t4 + j4 | |
| n/a | 0 | | |

$t_{0-}$: prior to time to the component is configured with the jitter profile, the line rate and the counter load mode. For this example, the counter load mode is set in such way that the dynamic watermark counter 6 is loaded with next jitter sample.

$t_0$: a packet arrives and its timestamp is modified with the first (j0) jitter profile sample. The packets send time controller 4 uses the packet length and the line rate to determine how long it takes for the packet to be sent.

$t_{0+}$: jitter sample (j0) is latched, the total packet send time 12 is cleared, and the jitter profile RAM's address is incremented. Once available, the next jitter sample (j1) is loaded to the dynamic watermark counter 6. The total packet send time block 12 is loaded with data from the packets send time controller 4. In this example, the dynamic watermark counter 6 is immediately greater than the value of the latch register added with the total packet send time block 12, and so the multiplexer 2 is switched and next arriving packet's timestamp will be modified.

$t_1$: the next packet arrives and its timestamp is modified with the second (j1) jitter profile sample. The packets send time controller 4 uses the packet length and the line rate to determine how long it takes for the packet to be sent.

$t_{1+}$: jitter sample (j1) is latched, the total packet send time block 12 is cleared, and the jitter profile RAM's address is incremented. Once available, the next jitter sample (j2) is loaded to the dynamic watermark counter 6, which starts incrementing from the value of j2, and the total packet send time block 12 is loaded with data from the packets send time controller 4.

$t_{1+8}$: when the dynamic watermark counter 6 reaches the value of the latch register 10 added with the total packet send time block 12, in this case after 8 time units, the multiplexer 2 is switched and the next arriving packet's timestamp will be modified.

$t_2$: the next packet arrives and its timestamp is modified with the third (j2) jitter profile sample.

Figure 13:
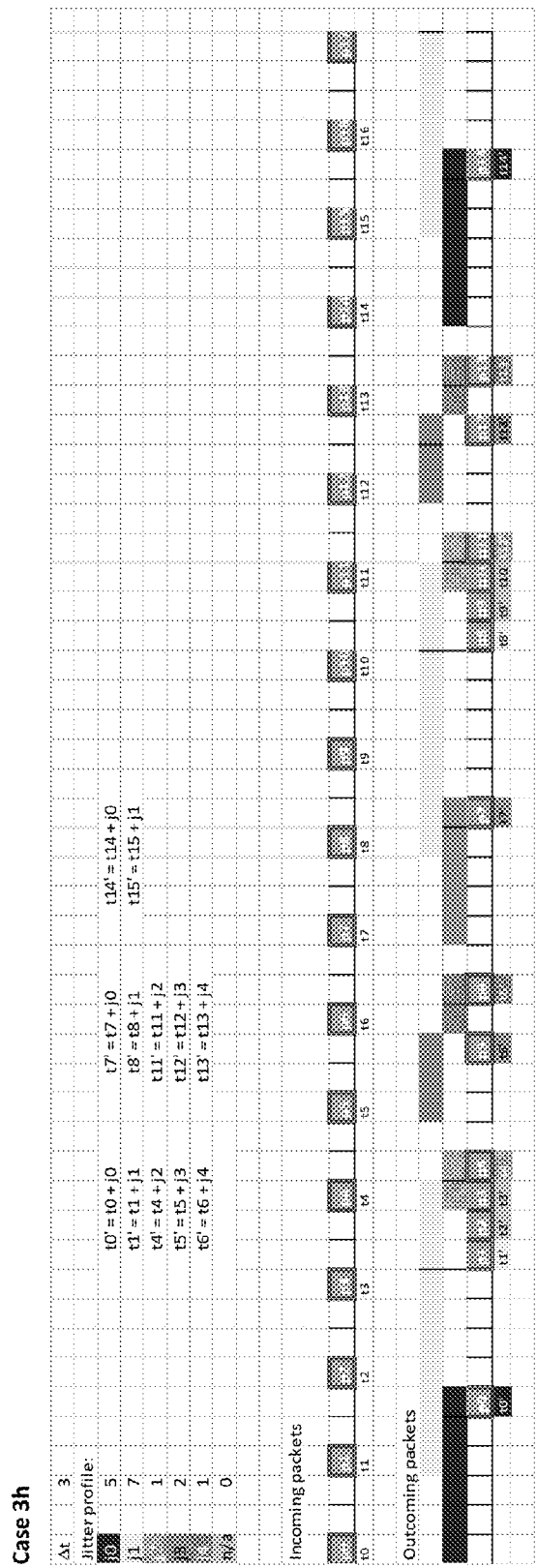

FIG. 13 shows another example of how the above descried methodology can be applied. This is for case 3h, which has the following jitter profile:

| Δt 3 | | | | |
|---|---|---|---|---|
| Jitter profile: | | | | |
| j0 | 5 | t0' = t0 + j0 | t7' = t7 + j0 | t14' = t14 + j0 |
| j1 | 7 | t1' = t1 + j1 | t8' = t8 + j1 | t15' = t15 + j1 |
| j2 | 1 | t4' = t4 + j2 | t11' = t11 + j2 | |
| j3 | 2 | t5' = t5 + j3 | t12' = t12 + j3 | |
| j4 | 1 | t6' = t6 + j4 | t13' = t13 + j4 | |
| n/a | 0 | | | |

$t_{0-}$: prior to time to component is configured with the jitter profile, the line rate and the counter load mode. For this example, the counter load mode is set in such way that the dynamic watermark counter 6 is loaded with next jitter sample.

$t_0$: a packet arrives and its timestamp is modified with the first (j0) jitter profile sample. The packets send time controller 4 uses the packet length and the line rate to determine how long it takes for the packet to be sent.

$t_{0+}$: the first jitter sample (j0) is latched, the total packet send time block 12 is cleared, and the jitter profile RAM's address is incremented. Once available, the next jitter sample (j1) is loaded to the dynamic watermark counter 6. The total packet send time block 12 is loaded with data from the packets send time controller 4. In this case, the dynamic watermark counter 6 is immediately greater than the value of latch register 10 added with the total packet send time block 12. Hence, the multiplexer 2 is switched and next arriving packet's timestamp will be modified.

$t_1$: a next packet arrives and its timestamp is modified with the second (j1) jitter profile sample. The packets send time controller 4 uses the packet length and the line rate to determine how long it takes for the packet to be sent.

$t_{1+}$: the previous jitter sample (j1) is latched, the total packet send time block 12 is cleared, and the jitter profile RAM's address is incremented to the next delay (j2). Once available, the next jitter sample (j2) is loaded to the dynamic watermark counter 6. The dynamic watermark counter 6 starts incrementing from the value of j2, and the total packet send time block 12 is loaded with data from the packets send time controller 4.

$t_2$: a packet arrives while the counter is still running; and the original timestamp is sent to the output port alongside packet data. This packet is unmodified. The packets send time controller 4 uses the packet length and the line rate to determine how long it takes for the packet to be sent. The total packet send time block 12 receives and accumulates new data from the packets send time controller 4. The dynamic watermark counter 6 keeps incrementing.

$t_3$: another packet arrives while the counter is still running, and the original timestamp is sent to the output port alongside packet data. The packets send time controller 4 uses the packet length and the line rate to determine how long it takes for the packet to be sent. The total packet send time block 12 receives and accumulates new data from the packets send time controller 4. The dynamic watermark counter 6 keeps incrementing.

$t_{4-}$: prior to time t4, when the dynamic watermark counter 6 reaches the value of the latch register 10 added with the total packet send time block 12, in this case after 9 time units, the multiplexer 2 is switched and next arriving packet's timestamp will be modified.

Figure 15:
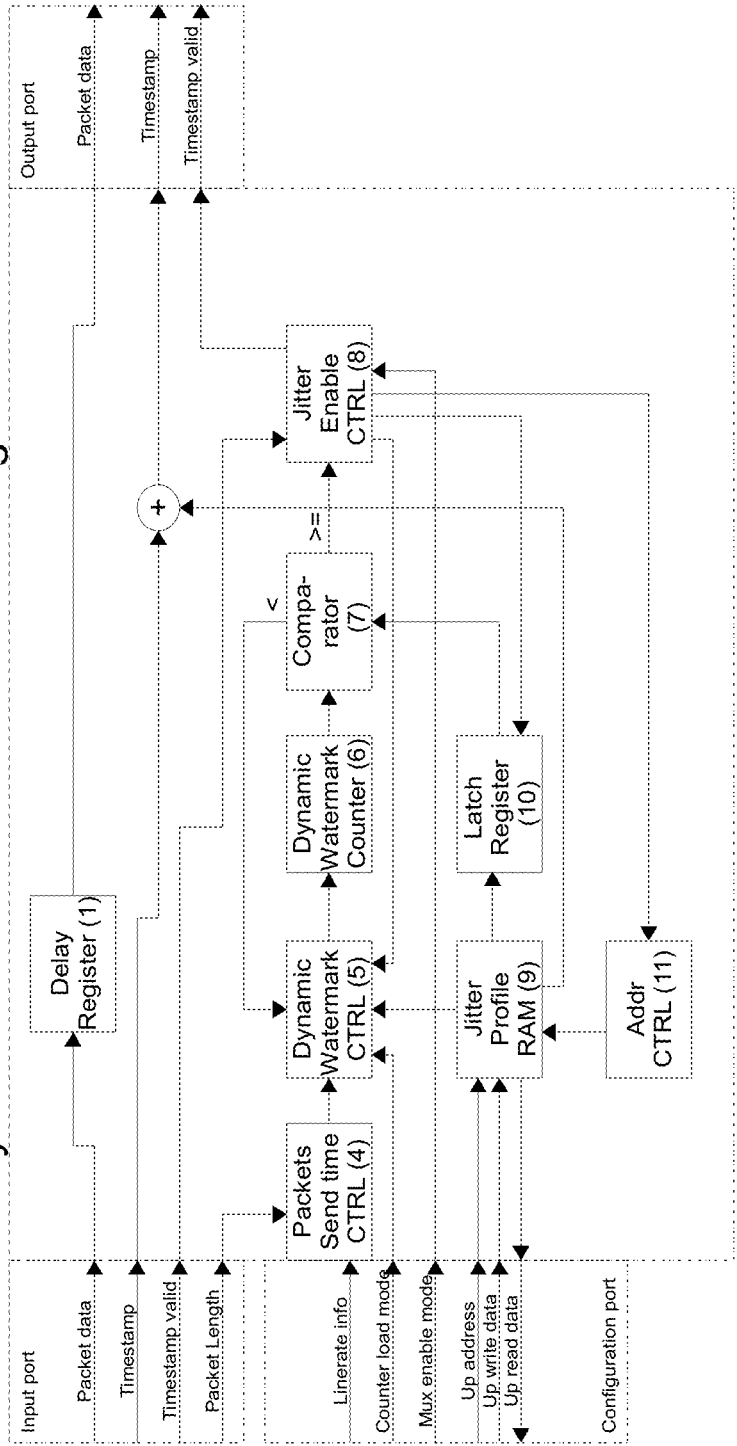
FIG. 15 is a block diagram of a modified version of FIG. 4.
Figure 16:
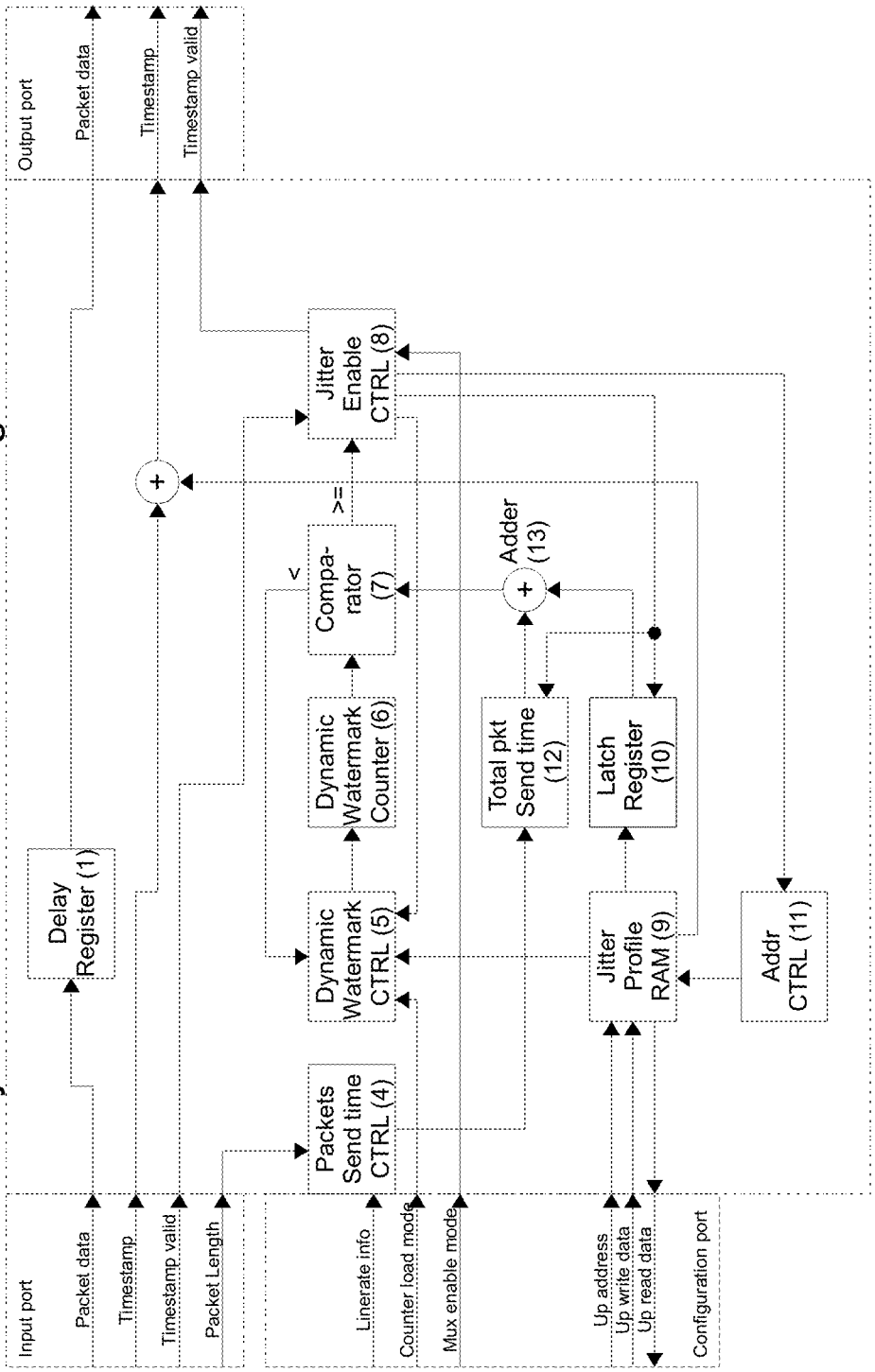
FIG. 16 is a block diagram of a modified version of FIG. 9.

$t_4$: next packet arrives and its timestamp is modified with the third (j2) jitter profile sample In both the embodiments described above, the jitter enable controller 8 sends a modified timestamp to the output port by switching the multiplexer 2 when the comparator 7 signals that the dynamic watermark counter 6 has reached the required value. Hence, only selected packets have their timestamps modified. In another embodiment, the multiplexer may be set so that all packets have their timestamp modified, albeit most will not be accurately delayed. This will be described with reference to FIG. 14. Alternatively, the multiplexer could be omitted altogether, as shown in FIGS. 15 and 16. FIG. 15 is a modified version of FIG. 4. FIG. 16 is a modified version of FIG. 9. The jitter enable controller 8 would still send signals to latch the current value in the latch register 10, to increment the jitter profile RAM's address, and through the adder controller 11 to load the next jitter sample to the dynamic watermark counter.

Figure 14:
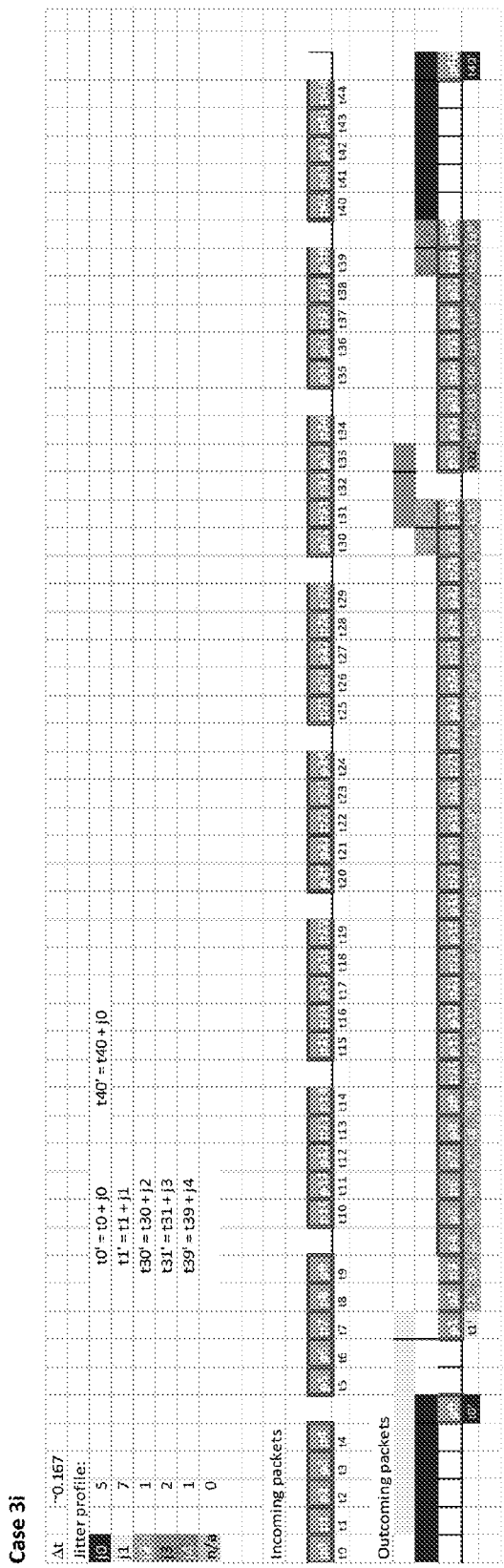

FIG. 14 shows another example of how the methodology of FIG. 9 can be applied. This is for case 3i, which has the following jitter profile:

| Δt 0.167 | |
|---|---|
| Jitter profile: | |
| j0 | 5 |
| j1 | 7 |
| j2 | 1 |
| j3 | 2 |
| j4 | 1 |
| n/a | 0 |

$t_{0-}$: prior to time to the component is configured with the jitter profile, the line rate and the counter load mode. For this example, the counter load mode is set in such way, that the dynamic watermark counter is loaded with next jitter sample.

$t_0$: a packet p0 arrives and its timestamp is modified with the first (j0) jitter profile sample. The packets send time controller 4 uses the packet length and the line rate to determine how long it takes for the packet to be sent.

$t_{0+}$: the jitter sample (j0) is latched, the total packet send time is cleared, the jitter profile RAM's address is incremented. Once available, the next jitter sample (j1) is loaded to the dynamic watermark counter. The total packet send time is loaded with data from the packets send time controller. In this case, the dynamic watermark counter is immediately greater than the value of the latch register added with the total packet send time. The multiplexer 2 is switched and the next arriving packet's timestamp will be modified.

$t_1$: the next packet p1 arrives and its timestamp is modified with the second (j1) jitter profile sample. The packets send time controller 4 uses the packet length and the line rate to determine how long it takes for the packet to be sent.

$t_{1+}$: the jitter sample (j1) is latched, the total packet send time is cleared, and the jitter profile RAM's address is incremented. Once available, the next, in this case third, jitter sample (j2) is loaded to the dynamic watermark counter, which starts incrementing from the value of j2. The total packet send time is loaded with data from the packets send time controller 4.

$t_2$: another packet p2 arrives while the counter is still running. The packets send time controller 4 uses the packet length and the line rate to determine how long it takes for the packet to be sent. In this case, a modified timestamp is sent to the output port alongside packet data (because the multiplexer in this example it not switched back to the "unmodified timestamp" position). The total packet send time block receives and accumulates new data from the packets send time controller. The dynamic watermark counter keeps incrementing.

$t_3$: another packet p3 arrives while the counter is still running. The packets send time controller 4 uses the packet length and the line rate to determine how long it takes for the packet to be sent. A modified timestamp is sent to the output port alongside packet data. The total packet send time receives and accumulates new data from the packets send time controller. The dynamic watermark counter keeps incrementing.

$t_4$: another packet p4 arrives while the counter is still running. The packets send time controller 4 uses the packet length and the line rate to determine how long it takes for the packet to be sent. A modified timestamp is sent to the output port alongside packet data. The total packet send time block receives and accumulates new data from the packets send time controller. The dynamic watermark counter keeps incrementing.

$t_5$-$t_{29}$: more packets p5-p29 arrive while the counter is still running. The packets send time controller 4 uses the packet length and the line rate to determine how long it takes for each packet to be sent. A modified timestamp is sent to the output port alongside packet data. The total packet send time receives and accumulates new data from the packets send time controller, this data representing the total time for all of the received packets to be sent. The dynamic watermark counter keeps incrementing.

$t_{5\_}$: prior to time t5, no packet arrives, and the output of the total packet send time block is not changed. At the same time the dynamic watermark counter is incremented by 1 time unit. This brings the counter 1 time unit closer to the value of the adder's output.

$t_{10\_}$: prior to time t10, no packet arrives, and the output of the total packet send time block is not changed. At the same time, the dynamic watermark counter is incremented by 1 time unit. This brings the counter 1 time unit closer to the value of the adder's output.

$t_{15\_}$: prior to time t15, no packet arrives, and the output of the total packet send time is not changed. At the same time, the dynamic watermark counter is incremented by 1 time unit. This brings the counter 1 time unit closer to the value of the adder's output.

$t_{20\_}$: prior to time t20, no packet arrives, and the output of the total packet sent time is not changed. At the same time, the dynamic watermark counter is incremented by 1 time unit. This brings the counter 1 time unit closer to the value of the adder's output.

$t_{25\_}$: prior to time t5, no packet arrives, and the output of the total packet send time block is not changed. At the same time, the dynamic watermark counter was incremented by 1 time unit. This brings the counter 1 time unit closer to the value of the adder's output.

$t_{30\_}$: prior to time t30, no packet arrives, and the output of the total packet send time block is not changed. At the same time, the dynamic watermark counter is incremented by 1 time unit. Finally, after 36 time units, the dynamic watermark counter reaches the value of the latch register added with the total packet send time. At this point the circuit looks like:

Latch Register: 7 (j1),
Total Pkt Send Time: 30 (accumulated time for all analysed packets: p0-p29)
Adder: 37
Dynamic Watermark Counter: 37 (36 time units has lapsed, counter started from 1-value of j1).

$t_{30}$: the next packet p30 arrives and its timestamp is modified with the third (j2) jitter profile sample.

In the above example, all packets are modified, but only a small number of these packets have a test profile delay accurately applied, i.e. p0, p1 and p30. Whilst all packets have their timestamps modified, the jitter profile RAM is not incremented until the current delay profile can be accurately applied to a packet. This means that within the output stream it is guaranteed that at least some packets have jitter delays that are accurately applied.

Operation of the circuit of FIG. 16 will now be described. However, it will be understood that FIG. 15 operates in a similar manner. As before, prior to sending any traffic, the component needs to be configured through the configuration port. Jitter profile RAM 9 needs to be loaded with test scenario profile and line rate information needs to be provided (for example 100 Mb, 1 Gb, 10 Gb). Once the configuration is done, the component is ready to process traffic. The default setting for the jitter enable controller 8 allows the next arriving packet's timestamp to be modified. When the packet arrives, the timestamp valid signal flags new timestamp on the input port. The jitter enable controller 8 sends a modified timestamp to the output port. At the same time, the jitter enable controller 8 latches the current value in the latch register 10, sends a signal to the address controller 11 to increment the jitter profile RAM's 9 address, so that next jitter sample is available.

Once available, the next jitter sample is loaded to the dynamic watermark counter 6 through the dynamic watermark controller 5. The total packet send time block 12 is cleared. Next, the dynamic watermark controller 5 starts incrementing the dynamic watermark counter 6. Additionally, the total packet send time block 12 receives data from the packets send time controller 4 about the time required to send out the current packet and accumulates the value. The dynamic watermark counter 6 is incremented, until it reaches the value of latch register 10 plus the total time in the total packet send time block 12, i.e. the output of the adder 13. If another packet arrives while the counter is still running, a timestamp modified with the current jitter sample is sent to the output port. However, it will be appreciated that this packet cannot be delayed accurately, and instead will be sent out back to back with other signals whenever it is possible to do so. At this stage, there is no change to the jitter profile address, and so the jitter sample remains unchanged. Additionally, the total packet send time block 12 will receive and accumulate new data from the packets send time controller 4. The dynamic watermark controller 5 keeps incrementing the dynamic watermark counter 6. This is repeated for each arriving packet until the dynamic watermark counter 6 reaches the value of adder's (13) output, at which stage a modified timestamp is sent to the output port. In this case, the delay can be implemented accurately. At the same time, the jitter enable controller 8 latches the current value in the latch register 10, sends a signal to the address controller 11 to increment the jitter profile RAM's 9 address, so that next jitter sample is available.

Figure 17:
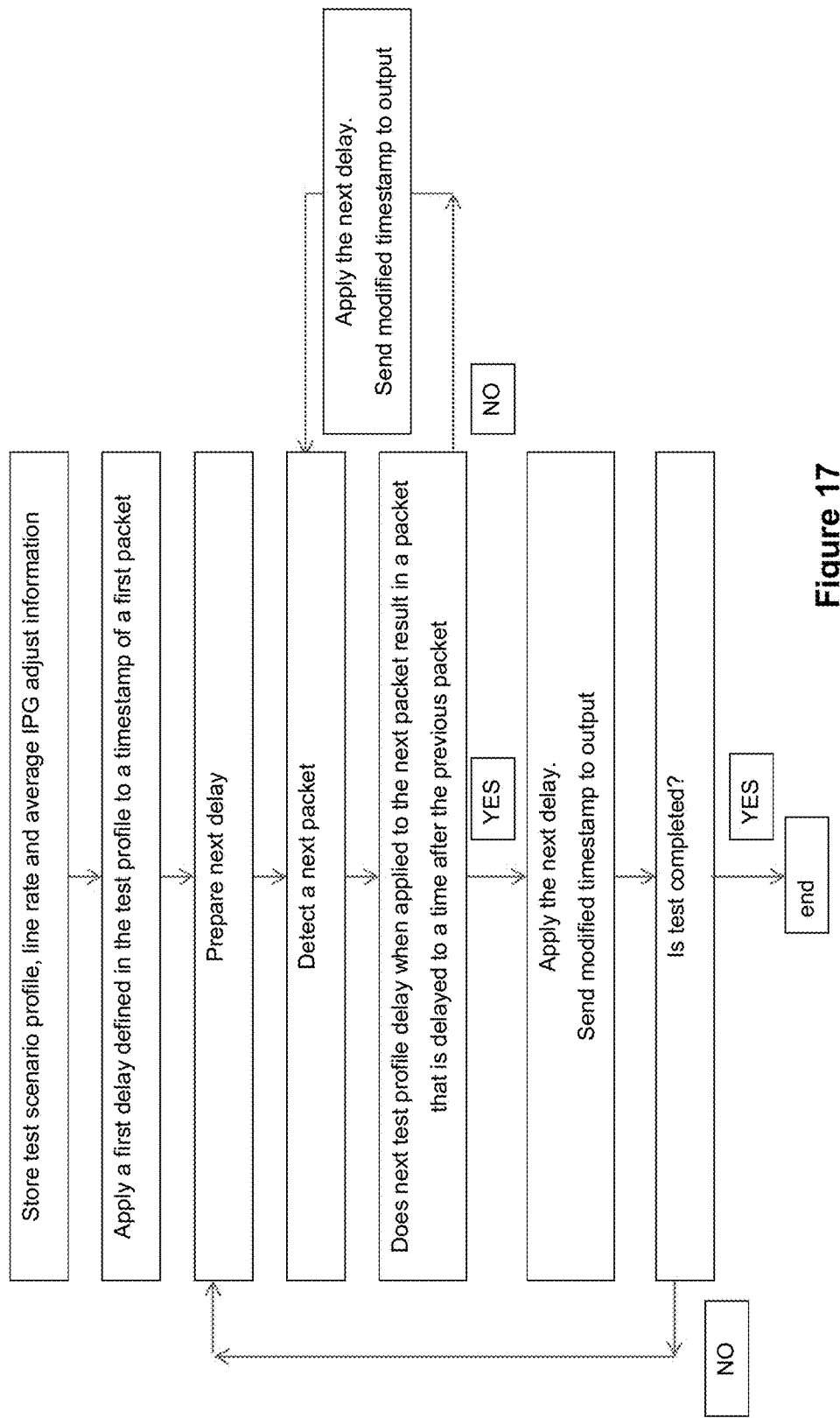
FIG. 17 is a flow diagram of a method for applying a jitter profile using the systems of FIGS. 15 and 16, and FIGS. 18 and 19 show schematic views of various streams of packets in a packet switched network with and without a jitter profile applied using the system of FIG. 16.

FIG. 17 summarises the steps that would be taken in operation of the systems of FIGS. 15 and 16.

Figure 18:
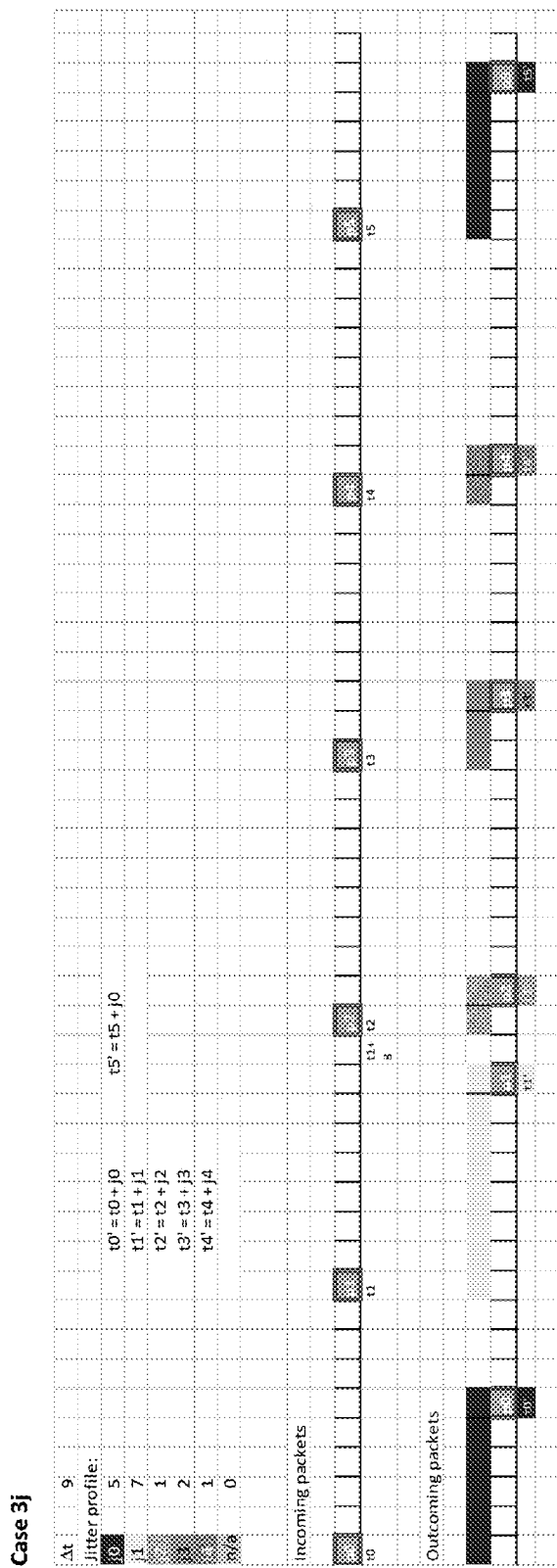

FIG. 18 shows an example of how the above descried methodology can be applied. This is for case 3*j*, which has the following jitter profile:

| At 9 | | | |
|---|---|---|---|
| Jitter profile: | | | |
| j0 | 5 | t0' = t0 + j0 | t5' = t5 + j0 |
| j1 | 7 | t1' = t1 + j1 | |
| j2 | 1 | t2' = t2 + j2 | |
| j3 | 2 | t3' = t3 + j3 | |
| j4 | 1 | t4' = t4 + j4 | |
| n/a | 0 | | |

$t_{0-}$: prior to time to component is configured with the jitter profile RAM, the line rate and counter load mode. For this example, the counter load mode is set in such way, that the dynamic watermark counter 6 is loaded with next jitter sample.

$t_0$: a packet arrives and its timestamp is modified with the first (j0) jitter profile sample. The packets send time controller 4 uses the packet length and the line rate to determine how long it takes for the packet to be sent.

$t_{0+}$: the jitter sample (j0) is latched, the total packet send time block 12 is cleared, the jitter profile RAM's address is incremented. Once available, the next jitter sample (j1) is loaded to the dynamic watermark counter 6. The total packet send time block 12 is loaded with data from the packets send time controller 4. In this case, the dynamic watermark counter 6 is immediately greater than the value of the latch register added with the total packet send time block 12 and so the next arriving packet's timestamp will be modified.

$t_1$: the next packet arrives and its timestamp is modified with the second (j1) jitter profile sample. The packets send time controller 4 uses the packet length and the line rate to determine how long it takes for the packet to be sent.

$t_{1+}$: the jitter sample (j1) is latched, the total packet send time block 12 is cleared, the jitter profile RAM's address is incremented. Once available, the next jitter sample (j2) is loaded to the dynamic watermark counter 6. The dynamic watermark counter 6 starts incrementing from the value of j2, the total packet send time block 12 is loaded with data from the packets send time controller 4.

$t_{1+8}$: when the dynamic watermark counter 6 reaches the value of the latch register added with the total packet send time block 12, in this case after 8 units of time and the next arriving packet's timestamp will be modified.

$t_2$: next packet arrives and its timestamp is modified with the third (j2) jitter profile sample.

Figure 19:
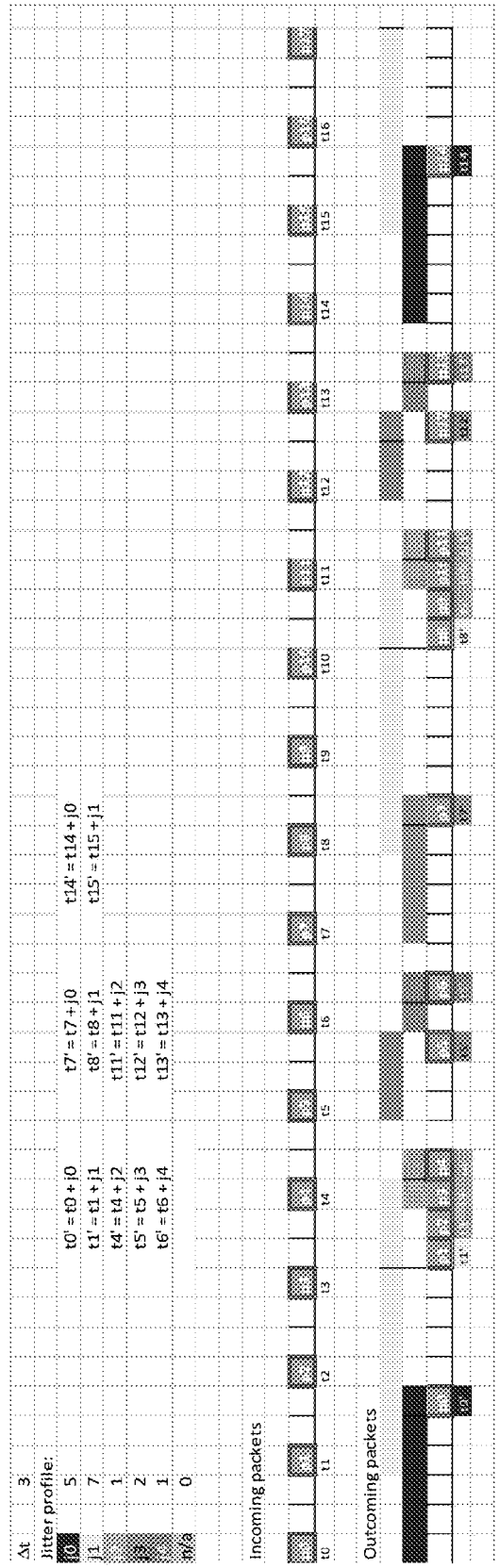

FIG. 19 shows an example of how the above described methodology can be applied. This is for case 3*k*, which has the following jitter profile:

| At 3 | | | | | |
|---|---|---|---|---|---|
| Jitter profile: | | | | | |
| j0 | 5 | t0' = t0 + j0 | t7' = t7 + j0 | t14' = t14 + j0 |
| j1 | 7 | t1' = t1 + j1 | t8' = t8 + j1 | t15' = t15 + j1 |
| j2 | 1 | t4' = t4 + j2 | t11' = t11 + j2 | |
| j3 | 2 | t5' = t5 + j3 | t12' = t12 + j3 | |
| j4 | 1 | t6' = t6 + j4 | t13' = t13 + j4 | |
| n/a | 0 | | | | |

$t_{0-}$: prior to time to component is configured with the jitter profile RAM, the line rate and the counter load mode. For this example, the counter load mode is set in such way, that the dynamic watermark counter 6 is loaded with the next jitter sample.

$t_0$: a packet arrives and its timestamp is modified with the first (j0) jitter profile sample. The packets send time controller 4 uses the packet length and the line rate to determine how long it takes for the packet to be sent.

$t_{0+}$: the jitter sample (j0) is latched, the total packet send time block 12 is cleared, and the jitter profile RAM's address is incremented. Once available, the next jitter sample (j1) is loaded to the dynamic watermark counter 6. The total packet send time block 12 is loaded with data from the packets send time controller 4. In this case, the dynamic watermark counter 6 is immediately greater than the value of the latch register added with the total packet send time block 12, and so the next arriving packet's timestamp will be modified and the delay implemented accurately.

$t_1$: a next packet arrives and its timestamp is modified with the second (j1) jitter profile sample. The packets send time controller 4 uses the packet length and the line rate to determine how long it takes for the packet to be sent.

$t_{1+}$: the jitter sample (j1) is latched, the total packet send time block 12 is cleared, and the jitter profile RAM's address is incremented. Once available, the next jitter sample (j2) is loaded to the dynamic watermark counter 6. The dynamic watermark counter 6 starts incrementing from the value of j2, and the total packet send time block 12 is loaded with data from the packets send time controller 4.

$t_2$: a next packet arrives while the counter is still running; and a timestamp modified with the current jitter sample, i.e. j2, is sent to the output port alongside packet data. In this case, because the counter is still running, although the timestamp is modified, the delay cannot be accurately implemented. The total packet send time block 12 receives and accumulates new data from the packets send time controller 4. The dynamic watermark counter 6 keeps incrementing. There is no change to the jitter profile RAM's address.

$t_3$: another packet arrives while the counter is still running and another timestamp modified with the current jitter sample, i.e. j2, is sent to the output port alongside packet data. Again, because the counter is still running, although the timestamp is modified, the delay cannot be accurately implemented. The total packet send time block 12 receives and accumulates new data from the packets send time controller 4. The dynamic watermark counter 6 keeps incrementing. There is no change to the jitter profile RAM's address.

$t_{4-}$: prior to time t4, when the dynamic watermark counter 6 reaches the value of the latch register added with the total packet send time block 12, in this case after 9 time units, the next arriving packet's timestamp will be modified $t_4$: next packet arrives its timestamp is modified with the third (j2) jitter profile sample. In this case, the time delay is accurately implemented. At this stage, the jitter sample is latched, the total packet send time block 12 is cleared, and the jitter profile RAM's address is incremented. Once available, the next jitter sample (j3) is loaded to the dynamic watermark counter 6. The dynamic watermark counter 6 starts incrementing from the value of j3, and the total packet send time block 12 is loaded with data from the packets send time controller 4.

The tester of the present invention can be implemented in any suitable form. In a preferred example, the tester is implemented using FPGAs.

A skilled person will appreciate that variations of the disclosed arrangements are possible without departing from the invention. Accordingly the above description of the specific embodiment is made by way of example only and not for the purposes of limitation. It will be clear to the skilled person that minor modifications may be made without significant changes to the operation described.

The invention claimed is:

1. A packet switched network tester for testing a network using a packet delay variation test profile that has a plurality of different test profile delays for applying to timestamps of packets received at the tester, the tester comprising a jitter delay circuit for applying a test profile delay defined in the test profile to a timestamp of a first packet and, for subsequent packets received at the tester, the tester being configured for:
   detecting a packet;
   determining whether the test profile delay when applied to the packet would result in a time during which the packet is to be sent being after a time during which all preceding packets are to be sent;
   in response to determining that the test profile delay does not result in the packet being delayed to a time after the preceding packet, repeating the detecting and determining steps with one or more subsequent packets;
   in response to determining that the test profile delay results in the packet being delayed to the time after the preceding packet, applying the test profile delay to the timestamp of the packet and identify a next test profile delay; and
   repeating for the next test profile delay the detecting and determining steps.

2. The network tester as claimed in claim 1, wherein the network tester is configured so that if a packet is not delayed to a time after any preceding packet then the timestamp of that packet is unmodified.

3. The network tester as claimed in claim 2, wherein the network tester is configured to pass any unmodified timestamp to an output for outputting with an associated packet.

4. The network tester as claimed in claim 1, wherein the jitter delay circuit is further configured for applying the next test profile delay to a timestamp in the event that when applied to the next packet that packet is delayed to a time after the preceding packet.

5. The network tester as claimed in claim 1, wherein the network tester is configured to determine a time required to send the next packet and use this to determine whether the next test profile delay when applied to the next packet would result in a packet that is delayed to a time after the preceding packet.

6. The network tester as claimed in claim 1, further comprising a counter for determining whether the next test profile delay when applied to the next packet would result in a packet that is delayed to a time after the preceding packet.

7. The network tester as claimed in claim 1, wherein the network tester is configured to store a previous delay for use in determining whether the next test profile delay when applied to the next packet would result in a packet that has a timestamp after the timestamp of the previously delayed packet.

8. The network tester as claimed in claim 7, further comprising a latch register that is latched to the previous delay.

9. The network tester as claimed in claim 1, further comprising a packet send time controller for determining the time needed to send a received packet.

10. The network tester as claimed in claim 1, wherein the network tester is implemented using field programmable gate arrays (FPGAs).

11. A method of testing a packet switched telecommunications network using a packet delay variation test profile that has a plurality of different test profile delays for applying to timestamps of all packets, the method comprising applying a test profile delay defined in the test profile to a timestamp of a first packet and, for subsequent packets received at the tester, the steps of:
   detecting a packet;
   determining whether a test profile delay when applied to the packet would result in a time during which the packet is scheduled to be sent being after a time during which all preceding packets are expected to be sent;
   in response to determining that the test profile delay does not result in the packet being delayed to a time after the preceding packet, repeating the detecting and determining steps with one or more subsequent packets;
   in response to determining that the test profile delay results in the packet being delayed to the time after the preceding packet, applying the test profile delay to the timestamp of the packet and identifying a next test profile delay; and
   repeating for the next test profile delay the detecting and determining steps.

12. The method as claimed in claim 11, further comprising passing unmodified timestamps to an output for outputting with an associated packet if a packet is not delayed to a time after any preceding packet.

13. The method as claimed in claim 11, further comprising determining a time required to send the next packet and using this to determine whether the next test profile delay when applied to the next packet would result in a packet that is delayed to a time after the preceding packet.

14. The method as claimed in claim 11, further comprising using a counter for determining whether the next test profile delay when applied to the next packet would result in a packet that is delayed to a time after the preceding packet.

15. The method as claimed in claim 11, further comprising using a latch register for latching to a previous delay for use in determining whether the next test profile delay when applied to the next packet would result in a packet that has a timestamp after the timestamp of the previously delayed packet.

16. The method as claimed in claim 11, further comprising determining the time needed to send a received packet and using this to determine whether a next delayed packet would have a timestamp after the previously delayed packet.

* * * * *